US006374216B1

(12) United States Patent
Micchelli et al.

(10) Patent No.: US 6,374,216 B1
(45) Date of Patent: Apr. 16, 2002

(54) PENALIZED MAXIMUM LIKELIHOOD ESTIMATION METHODS, THE BAUM WELCH ALGORITHM AND DIAGONAL BALANCING OF SYMMETRIC MATRICES FOR THE TRAINING OF ACOUSTIC MODELS IN SPEECH RECOGNITION

(75) Inventors: Charles A. Micchelli, Mohegan Lake; Peder A. Olsen, New York, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,995

(22) Filed: Sep. 27, 1999

(51) Int. Cl.[7] .......................... G10L 15/08; G10L 15/12

(52) U.S. Cl. ....................... 704/236; 704/231

(58) Field of Search ................................ 704/251–256, 704/236–240

(56) References Cited

U.S. PATENT DOCUMENTS 5,893,058 A * 4/1999 Kosaka ........................ 704/254
6,148,284 A * 11/2000 Saul ............................ 704/256

OTHER PUBLICATIONS

Feng et al ("Application of Structured Composite Source Models to Problems in Speech Processing," Proceedings of the 32nd Midwest Symposium on Circuits and Systems, pp. 89–92, 14–16 Aug. 1989.).*

Fonollosa et al ("Application of Hidden Markov Models to Blind Channel Characterization and Data Detection," 1994 IEEE International Conference on Acoustics, Speech, and Signal Processing, pp. IV/185–IV188, Apr. 19–22, 1994).*

Kogan ("Hidden Markov Models Estimation via the Most Informative Stopping Times for Viterbi Algorithm," 1995 IEEE International Symposium on Information Theory Proceedings, p. 178, Sep. 17–22, 1995).*

L. Liporace, "Maximum Likelihood Estimation for Multivariate Observations of Markov Sources", IEEE Transactions of Information Theory, vol. IT–28, No. 5, Sep. 1982.

L. Baum et al., "A Maximum Technique Occurring in the Statistical Analysis of Probabilistic Functions of Markov Chains", The Annals of Mathematical Statistics, 1970, vol. 41, No. 1, 164–171.

B. W. Silverman, "On the Estimation of a Probability Density Function by the Maximum Penalized Likelihood Method", The Annals of Mathematical Statistics, 1982, vol. 10, No. 4, 795–810.

A.P. Dempster et al., "Maximum Likelihood from Incomplete Data via the EM Algorithm", Journal of Royal Statistical Society, 39(B), pp. 1–38, 1977.

A. Marshall et al., "Scaling of Matrices to Achieve Specified Row and Column Sums", Numerische Mathematik 12, 83–90 (1968).

R. Brualdi, et al., "The Diagonal Equivalence of a Nonnegative Matrix to a Stochastic Matrix", Journal of Mathematical Analysis and Applications 16, 31–50 (1966).

(List continued on next page.)

Primary Examiner—Richemond Dorvil
Assistant Examiner—Daniel A. Nolan
(74) Attorney, Agent, or Firm—Whitham, Curtis & Christofferson, P.C.; Stephen C. Kaufman

(57) ABSTRACT

A nonparametric family of density functions formed by histogram estimators for modeling acoustic vectors are used in automatic recognition of speech. A Gaussian kernel is set forth in the density estimator. When the densities are found for all the basic sounds in a training stage, an acoustic vector is assigned to a phoneme label corresponding to the highest likelihood for the basis of the decoding of acoustic vectors into text.

15 Claims, 13 Drawing Sheets

OTHER PUBLICATIONS

L.E. Baum et al., "An Inequality with Applications to Statistical Estimation for Probabilistic Functions of Markov Processes and to a Model of Ecology", Bull. Amer. Math. Soc. 73, pp. 360–363, 1967.

S. Basu et al., "Maximum Likelihood Estimation for Acoustic Vectors in Speech Recognition", Advanced Black–Box Techniques for Nonlinear Modeling: Theory and Applications, Kulwer Publishers (1998).

R. Sinkhorn, "A Relationship Between Arbitrary Positive Matrices and Doubly Stochastic Matrices", Ann. Math. Statist., 38, pp. 439–455, 1964.

* cited by examiner

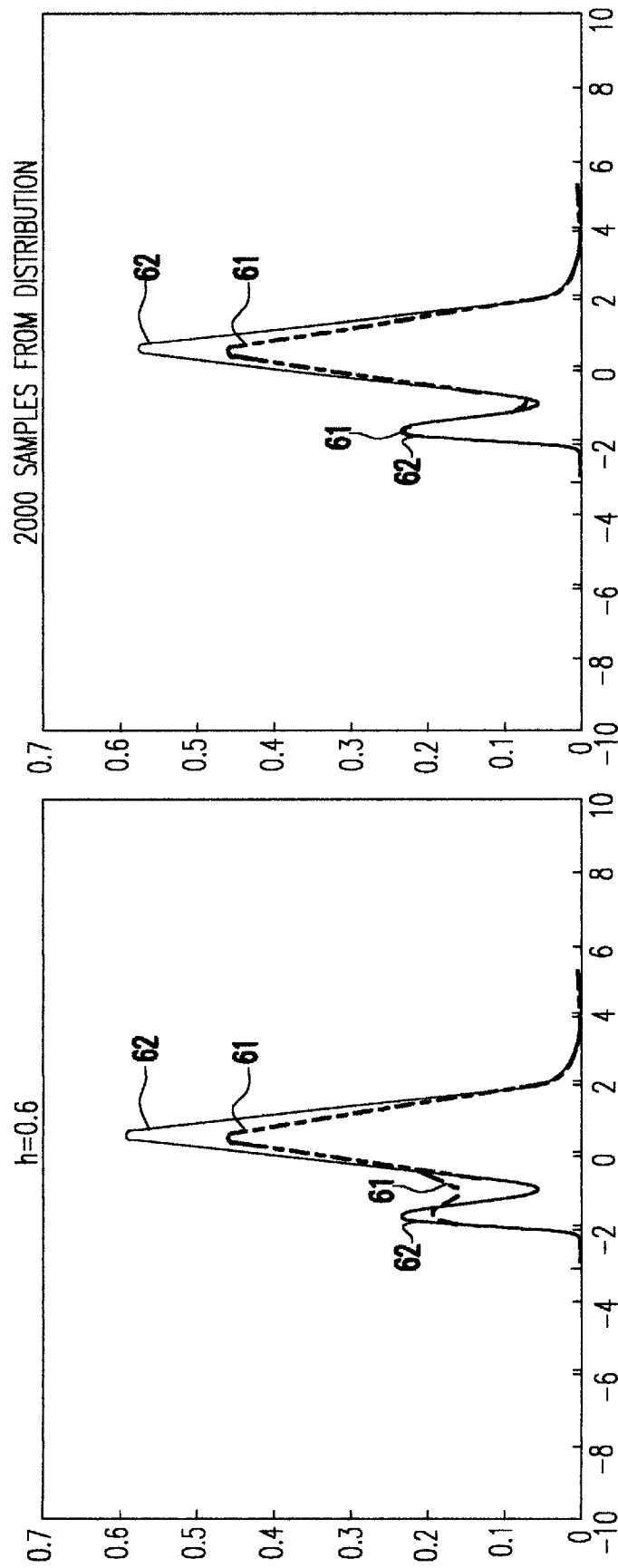

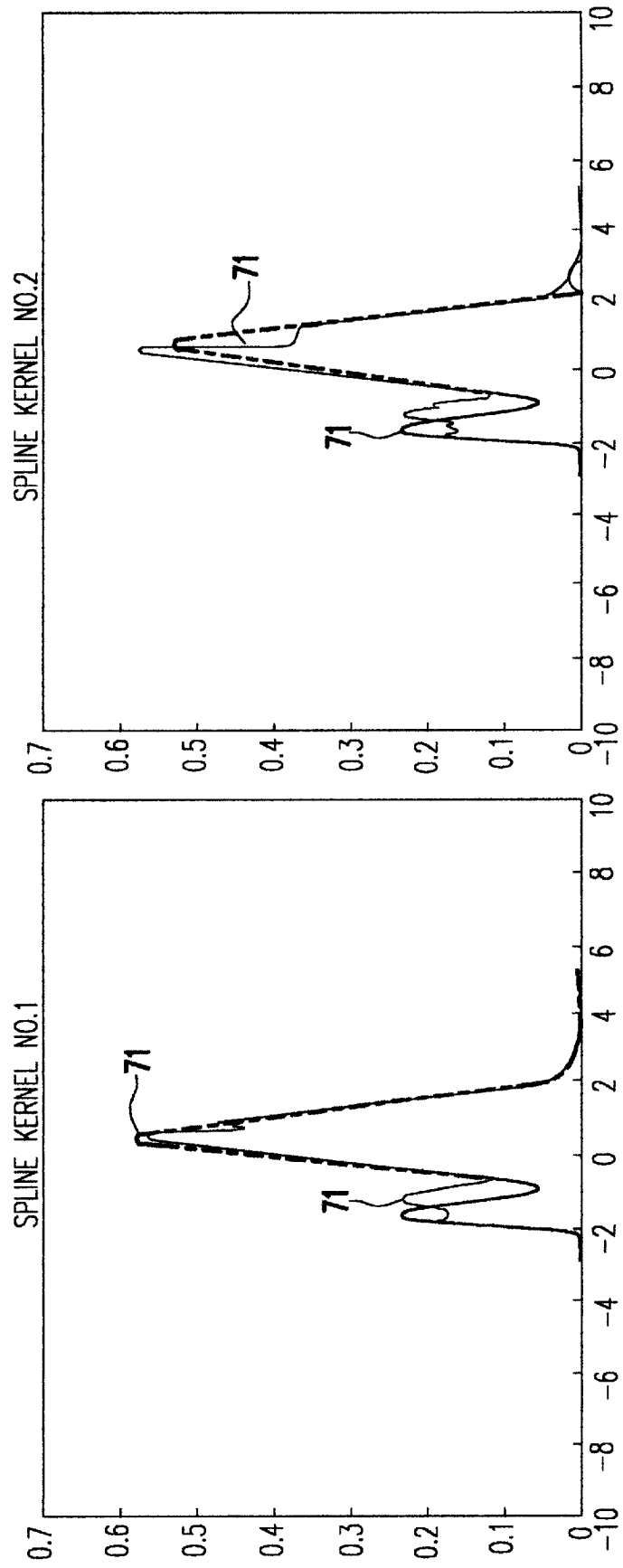

PENALIZED MAXIMUM LIKELIHOOD ESTIMATION METHODS, THE BAUM WELCH ALGORITHM AND DIAGONAL BALANCING OF SYMMETRIC MATRICES FOR THE TRAINING OF ACOUSTIC MODELS IN SPEECH RECOGNITION

BACKGROUND OF THE INVENTION

1. Field of the Invention

The present invention generally relates to methods of speech recognition and, more particularly, to nonparametric density estimation of high dimensional data for use in training models for speech recognition.

2. Background Description

In the present invention, we are concerned with nonparametric density estimation of high dimensional data. The invention is driven by its potential application to training speech data where traditionally only parametric methods have been used. Parametric models typically lead to large scale optimization problems associated with a desire to maximize the likelihood of the data. In particular, mixture models of gaussians are used for training acoustic vectors for speech recognition, and the parameters of the model are obtained by using K-means clustering and the EM algorithm, see F. Jelinek, Statistical Methods for Speech Recognition, The MIT Press, Cambridge Mass., 1998. Here we consider the possibility of maximizing the penalized likelihood of the data as a means to identify nonparametric density estimators, see I. J. Good and R. A. Gaskin, "Nonparametric roughness penalties for probability densities," *Biometrika* 58, pp. 255–77, 1971. We develop various mathematical properties of this point of view, propose several algorithms for the numerical solution of the optimization problems we encounter, and we report on some of our computational experience with these methods. In this regard, we integrate within our framework a technique that is central in many aspects of the statistical analysis of acoustic data, namely the Baum Welch algorithm, which is especially important for the training of Hidden Markov Models, see again the book by F. Jelinek, cited above.

Let us recall the mechanism in which density estimation of high dimensional data arises in speech recognition. In this context, a principal task is to convert acoustic waveforms into text. The first step in the process is to isolate important features of the waveform over small time intervals (typically 25 mls). These features, represented by a vector $x \in R^d$ (where d usually is 39) are then identified with context dependent sounds, for example, phonemes such as "AA", "AE", "K", "H". Strings of such basic sounds are then converted into words using a dictionary of acoustic representations of words. For example, the phonetic spelling of the word "cat" is "K AE T". In an ideal situation the feature vectors generated by the speech waveform would be converted into a string of phonemes "K . . . K AE . . . AE T . . . T" from which we can recognize the word "cat" (unfortunately, a phoneme string seldom matches the acoustic spelling exactly).

One of the important problems associated with this process is to identify a phoneme label for an individual acoustic vector x. Training data is provided for the purpose of classifying a given acoustic vector. A standard approach for classification in speech recognition is to generate initial "prototypes" by K-means clustering and then refine them by using the EM algorithm based on mixture models of gaussian densities, cf F. Jelinek, cited above. Moreover, in the decoding stage of speech recognition (formation of Hidden Markoff Models) the output probability density functions are most commonly assumed to be a mixture of gaussian density functions, cf. L. E. Baum and J. A. Eagon, "An inequality with applications to statistical estimation for probabilistic functions of Markov processes and to a model of ecology," *Bull. Amer. Math. Soc.* 73, pp. 360–63, 1967; L. A. Liporace, "Piecewise polynomial, positive definite and compactly supported radial functions of minimal degree," *IEEE Trans. on Information Theory* 5, pp. 729–34, 1982; R. A. Gopinath, "Constrained maximum likelihood modeling with gaussian distributions," Broadcast News Transcription and Understanding Workshop, 1998.

SUMMARY OF THE INVENTION

According to this invention, we adopt the commonly used approach to classification and think of the acoustic vectors for a given sound as a random variable whose density is estimated from the data. When the densities are found for all the basic sounds (this is the training stage) an acoustic vector is assigned the phoneme label corresponding to the highest scoring likelihood (probability). This information is the basis of the decoding of acoustic vectors into text.

Since in speech recognition x is typically a high dimensional vector and each basic sound has only several thousand data vectors to model it, the training data is relatively sparse. Recent work on the classification of acoustic vectors, see S. Basu and C. A. Micchelli, "Maximum likelihood estimation for acoustic vectors in speech recognition," *Advanced Black-Box Techniques For Nonlinear Modeling: Theory and Applications,* Kluwer Publishers (1998), demonstrates that mixture models with non-gaussian mixture components are useful for parametric density estimation of speech data. We explore the use of nonparametric techniques. Specifically, we use the penalized maximum likelihood approach introduced by Good and Gaskin, cited above. We combine the penalized maximum likelihood approach with the use of the Baum Welch algorithm, see L. E. Baum, T. Petrie, G. Soules and N. Weiss, "A maximization technique occurring in the statistical analysis of probabilistic functions of Markov chains," *The Annals of Mathematical Statistics* 41, No. 1, pp. 164–71, 1970; Baum and Eagon, cited above, often used in speech recognition for training Hidden Markoff Models (HMMs). (This algorithm is a special case of the celebrated EM algorithm as described, e.g., A. P. Dempster, N. M. Liard and D. B. Baum, "Maximum likelihood from incomplete data via the EM algorithm," *Journal of Royal Statistical Soc.* 39(B), pp. 1–38, 1977.)

We begin by recalling that one of the most widely used nonparametric density estimators has the form $$f_n(x) = \frac{1}{nh^d} \sum_{i \in Z_n} k\left(\frac{x - x^i}{h}\right), x \in R^d \qquad (1)$$

where $Z_n = \{1, \ldots, n\}$, k is some specified function, and $\{x_i : i \in Z_n\}$ is a set of observations in $R^d$ of some unknown random variable, cf. T. Cacoullos, "Estimates of a multivariate density," *Annals of the Institute of Statistical Mathematics* 18, pp. 178–89, 1966; E. Parzen, "On the estimation of a probability density function and the mode," *Annals of the Institute of Statistical Mathematics* 33, pp. 1065–76, 1962; M. Rosenblatt, "Remarks on some nonparametric estimates of a density function," *Annals of Mathematical Statistics* 27, pp. 832–37, 1956. It is well known that this estimator converges almost surely to the underlying probability density function (PDF) provided that the kernel k is strictly positive on $R^d$, $\int_{R^d} k(x)dx=1$, $h\to 0$, $nh\to\infty$, and $n\to\infty$. The problem of how best to choose n and h for a fixed kernel k for the estimator (1) has been thoroughly discussed in the literature, cf. L. Devroye and L. Györfi, Nonparametric Density Estimation, The $L_1$ View, John Wiley & Sons, New York, 1985.

In this invention, we are led, by the notion of penalized maximum likelihood estimation (PMLE), to density estimators of the form $$f(x) = \sum_{i \in Z_n} c_i k(x, x^i), x \in R^d \quad (2)$$

where k(x, y), x, y$\in R^d$ is the reproducing kernel in some Hilbert space H, cf S. Saitoh, Theory of Reproducing Kernels and its Applications, *Pilman Research Notes in Mathematical Analysis,* Longman Scientific and Technical, Essex, UK, 189,1988.

Among the methods we consider, the coefficients in this sum are chosen to maximize the homogeneous polynomial $$\prod (Kc) := \prod_{i \in Z_n} \left( \sum_{j \in Z_n} K_{ij} c_j \right), c = (c_1, \ldots, c_n)^T, \quad (3)$$

over the simplex $$S^n = \{c : c \in R_+^n, e^T c = 1\}, \quad (4)$$

where $e=(1, \ldots, 1)^T \in R^n$, $$R_+^n = \{c : c = (c_1, \ldots, c_n)^T, c_i \geq 0, i \in Z_n\}, \quad (5)$$

the positive orthant, K is the matrix $$K = \{K_{ij}\}_{i,j \in Z_n} = \{k(x^i, x^j)\}_{i,j \in Z_n} \quad (6)$$

and accomplish this numerically by the use of the Baum Welch algorithm, cf. L. E. Baum, T. Petrie, G. Soules and N. Weiss, cited above; L. E. Baum and J. A. Eagon, cited above. A polynomial in the factored form (3) appears in the method of deleted interpolation which occurs in language modeling, see L. R. Bahl, P. F. Brown, P. V. de Souza, R. L. Mercer, and D. Nahamoo, "A fast algorithm for deleted interpolation," *Proceedings Eurospeech* 3, pp. 1209–12, 1991. In the context of geometric modeling they have been called lineal polynomials, see A. S. Cavaretta and C. A. Micchelli, "Design of curves and surfaces by subdivision algorithms," in *Mathematical Methods in Computer Aided Geometric Design,* T. Lyche and L. Schumaker (eds.), Academic Press, Boston, 1989, 115–53, and C. A. Micchelli, Mathematical Aspects of Geometric Modeling, *CBMSF-NSF Regional Conference Series in Applied Mathematics* 65, SIAM Philadelphia, 1995. A comparison of the Baum Welch algorithm to the degree raising algorithm, see C. A. Micchelli and A. Pinkus, "Some remarks on nonnegative polynomials on polyhedra" in Probability, Statistics and Mathematics: Papers in Honor of Samuel Karlin, Eds. T. W. Anderson, K. B. Athreya and D. L. Iglehart, *Academic Press,* San Diego, pp. 163–86, 1989, which can also be used to find the maximum of a homogeneous polynomial over a simplex, will be made. We also elaborate upon the connection of these ideas to the problem of the diagonal similarity of a symmetric nonsingular matrix with nonnegative elements to a doubly stochastic matrix, see M. Marcus and M. Newman, "The permanent of a symmetric matrix," Abstract 587–85, *Amer. Math. Soc. Notices* 8, 595; R. Sinkhorn, "A relationship between arbitrary positive matrices and doubly stochastic matrices,"*Ann. Math. Statist.* 38, pp. 439–55, 1964. This problem has attracted active interest in the literature, see M. Bacharach, "Biproportional Matrices and Input-Output Change," Monograph 16, Cambridge University press, 1970; L. M. Bergman, "Proof of the convergence of Sheleikhovskii's method for a problem with transportation constraints," *USSR Computational Mathematics and Mathematical Physics* 1(1), pp. 191–204, 1967; S. Brualdi, S. Parter and H. Schneider, "The diagonal equivalence of a non-negative matrix to a stochastic matrix," *J. Math. Anal. and Appl.* 16, pp. 31–50, 1966; J. Csima and B. N. Datta, "The DAD theorem for symmetric non-negative matrices," *Journal of Combinatorial Theory* 12(A), pp. 147–52, 1972; G. M. Engel and H. Schneider, "Algorithms for testing the diagonal similarity of matrices and related problems," *SIAM Journal of Algorithms in Discrete Mathematics* 3(4), pp.429–38, 1982; T. E. S. Raghavan, "On pairs of multidimensional matrices," *Linear Algebra and Applications* 62, pp. 263–68, 1984; G. M. Engel and H. Schneider, "Matrices diagonally similar to a symmetric matrix," *Linear Algebra and Applications* 29, pp. 131–38, 1980; J. Franklin and J. Lorenz, "On the scaling of multidimensional matrices," *Linear Algebra and Applications* 114/115, pp. 717–35, 1989; D. Hershkowitz, U. G. Rothblum and H. Schneider, "Classification of nonnegative matrices using diagonal equivalence," *SIAM Journal on Matrix Analysis and Applications* 9(4), pp. 455–60, 1988; S. Karlin and L. Nirenberg, "On a theorem of P. Nowosad," *Mathematical Analysis and Applications* 17, pp.61–67, 1967; A. W. Marshall and I. Olkin, "Scaling of matrices to achieve specified row and column sums," *Numerische Mathematik* 12, pp. 83–90, 1968; M. V. Menon and H. Schneider, "The spectrum of a nonlinear operator associated with a matrix," *Linear Algebra and its Applications* 2, pp. 321–34, 1969; P. Novosad, "On the integral equation Kf=1/f arising in a problem in communication," *Journal of Mathematical Analysis and Applications* 14, pp. 484–92, 1966; T. E. S. Raghavan, "On pairs of multidimensional matrices," *Linear Algebra and Applications* 62, pp.263–68, 1984; U. G. Rothblum, "Generalized scaling satisfying linear equations," *Linear Algebra and Applications* 114/115, pp. 765–83, 1989; U. G. Rothblum and H. Schneider, "Scalings of matrices which have prescribed row sums and column sums via optimization," *Linear Algebra and Applications* 114/115, pp.737–64, 1989; U. G. Rothblum and H. Schneider, "Characterization of optimal scaling of matrices," *Mathematical Programming* 19, pp. 121–36, 1980; U. G. Rothblum, H. Schneider and M. H. Schneider, "Scaling matrices to prescribed row and column maxima," *SIAM J. Matrix Anal. Appl.* 15, pp. 1–14, 1994; B. D. Saunders and H. Schneider, "Flows on graphs applied to diagonal similarity and diagonal equivalence for matrices," *Discrete Mathematics* 24, pp. 205–20, 1978; B. D. Saunders and H. Schneider, "Cones, graphs and optimal scaling of matrices," *Linear and Multilinear Algebra* 8, pp. 121–35, 1979; M. H. Schneider, "Matrix scaling, entropy minimization and conjugate duality. I Existence conditions," *Linear Algebra and Applications* 114/115, pp. 785–813, 1989; R. Sinkhorn, cited above; R. Sinkhorn and P. Knopp, "Concerning nonnegative matrices and doubly stochastic matrices," *Pacific J. Math.* 212, pp. 343–48, 1967, and has diverse applications in economics, operations research, and statistics.

Several of the algorithms described here were tested numerically. We describe their performance both on actual speech data and data generated from various standard probability density functions. However, we restrict our numerical experiments to scalar data and will describe elsewhere statistics on word error rate on the Wall Street Journal speech data base, as used in S. Basu and C. A. Micchelli, cited above.

BRIEF DESCRIPTION OF THE DRAWINGS

The foregoing and other objects, aspects and advantages will be better understood from the following detailed description of a preferred embodiment of the invention with reference to the drawings, in which:

FIG. 6A is a plot of the Baum Welch estimator and the actual probability density for n=500, h=0.6 and the gaussian kernel;

FIG. 6B is a plot of the Baum Welch estimator and the actual probability density for n=2000, h=0.3 and the gaussian kernel;

FIG. 7A is a plot of the Baum Welch estimator for n=2000, h=0.3 and the spline kernel $f_i$ for i=1;

FIG. 7B is a plot of the Baum Welch estimator for n=2000, h=0.3 and the spline kernel $f_i$ for i=2;

DETAILED DESCRIPTION OF PREFERRED EMBODIMENTS OF THE INVENTION

Penalized Maximum Likelihood Estimation

Figure 1:
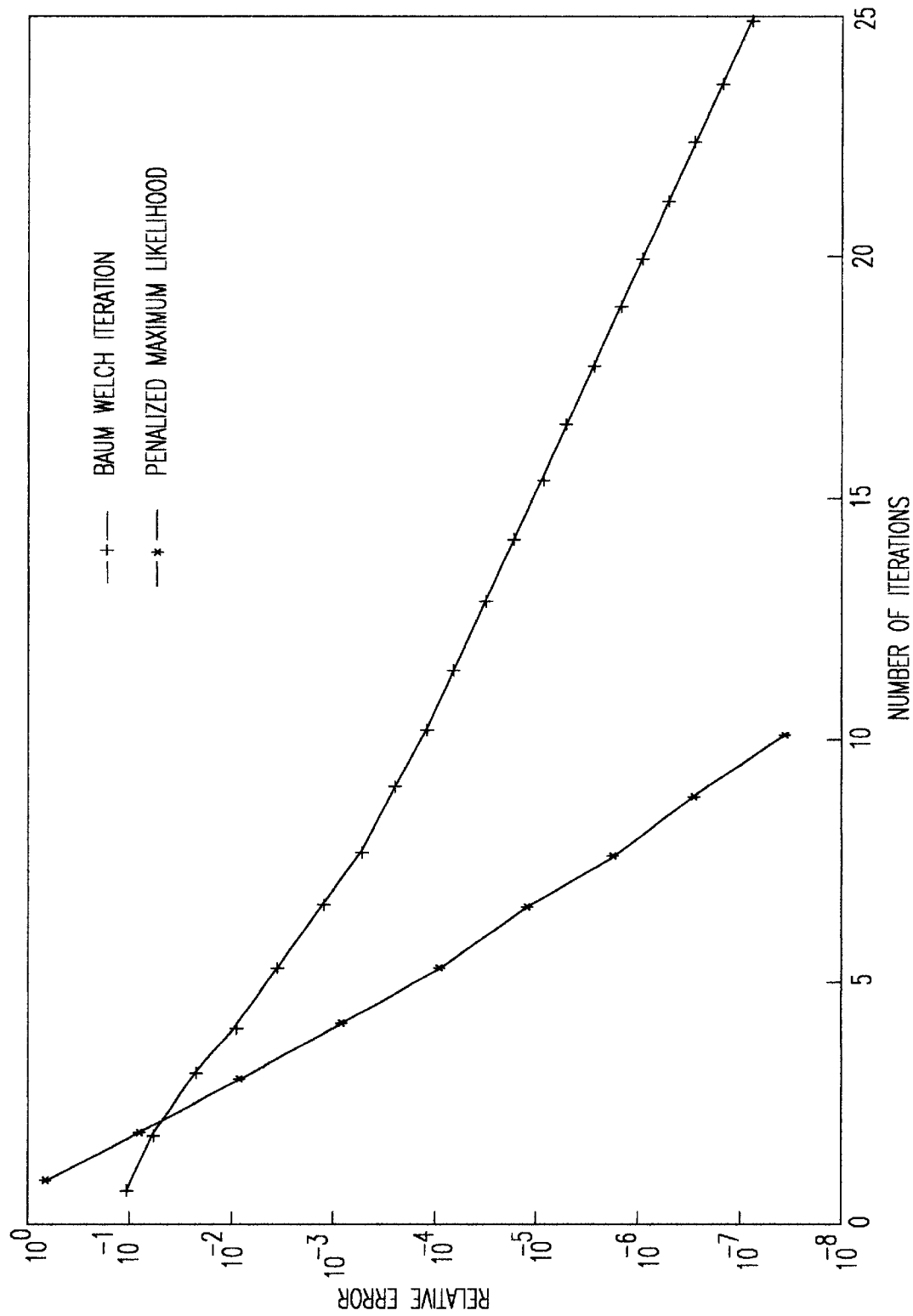
FIG. 1 is a convergence plot of the iteration methods given by Penalized MLE and Baum-Welch.

Let $x^1, \ldots, x^n$ be independent observations in $R^d$ from some unknown random variable with probability density function (PDF) $f$. The likelihood function of the data $$L(f) := \prod_{i \in Z_n} f(x^i) \tag{7}$$

is used to assess the value of a specific choice for $f$. In a parametric statistical context a functional form of $f$ is assumed. Thus, we suppose that $f=f(\bullet, a)$ where a is an unknown parameter vector that determines $f$. For example, $f$ may be a mixture model of gaussian PDFs with unknown means, covariances and mixture weights. The parametric Maximum Likelihood Estimator (MLE) point of view tries to maximize the likelihood function over a. Such a data dependent choice of a is then used to specify the density $f$. If no information on $f$ is known (or assumed) then it is clear that the likelihood function can be made arbitrarily large with a PDF that is concentrated solely at the data points $x^i$, $i \in Z_n$. When such density functions are used for classification algorithms the phenomenon of over training results. Thus, only actual training data can be classified and no others. To remedy this problem it has been suggested that one penalizes the likelihood function for oscillations in its derivatives, see I. J. Good and R. A. Gaskin, cited above. It is this point of view which we study here for the purpose of classification of acoustic vectors in speech recognition.

Let us recall the setup for penalized likelihood estimation. We let H be a Hilbert space of real-valued functions on $R^d$ for which point evaluations is a continuous linear functional. In other words, H is a reproducing kernel Hilbert space, cf. S. Saitoh, cited above. Therefore, there exists a real-valued $k(x,y)$, $x, y \in R^d$ such that for every $x \in R^d$ the function $k(x,\bullet)$ is in H and for every $f$ in H we have $$f(x) = <k(x, \bullet), f> \tag{8}$$

where $<\bullet,\bullet>$ represents the inner product on H. Recall that for any $x^1, \ldots, x^n$ in $R^d$ the matrix $$K = \{k(x^i, x^j)\}_{i,j \in Z_n} \tag{9}$$

is symmetric and positive semi-definite. Moreover, when the point evaluation functional at the data $x^1, \ldots, x^n$ are linearly independent this matrix is positive definite.

Corresponding to this Hilbert space H and data $x^1, \ldots, x^n$ the penalized likelihood function is defined to be $$P(f) = \left( \prod_{i \in Z_n} f(x^i) \right) e^{-1/2 \|f\|^2} \tag{10}$$

where $\|-\|$ is the norm on H. Maximizing this function over H for specific Hilbert spaces has been given in I. J. Good and R. A. Gaskin, cited above; J. R. Thompson and R. Tapia, Nonparametric Probability Density Estimation, The Johns Hopkins University Press, Baltimore, 1978; J. R. Thompson and R. Tapia, Nonparametric Function Estimation, *Modeling and Simulation,* SIAM, Philadelphia, 1970. For example, the PMLE for scalar data relative to a Sobolev norm has been obtained in J. R. Thomopson and R. Tapia, cited above.

Since our motivation in this paper comes from speech recognition, the value of n is typically 5,000 and the dimension d is 39. Moreover, density estimators are needed for as many as 4,000 groups of vectors, cf. S. Basu and C. A. Micchelli, cited above; F. Jelinek, cited above. Although the ideas from C. A. Micchelli and F. I. Utreras, "Smoothing and interpolation in a convex subset of a Hilbert Space," *SIAM Journal of Scientific and Statistical Computing* 9, pp. 728–46, 1988; C. A. Micchelli and F. I. Utreras, "Smoothing and interpolation in a convex subset of a semi-Hilbert Space," *Mathematical Modeling and Numerical Methods* 4, pp. 425–40, 1991, should be helpful to solve the large scale optimization problem of maximizing P over all PDFs in a suitably chosen Hilbert space, this seems to be computationally expensive. Thus, our strategy is to remove some of the constraints on $f$ and maximize the absolute value of $P(f)$ over all $f \in H$. As we shall see, this is an easier task. After determining the parametric form of such an $f$, we will then impose the requirement that it be a PDF.

Let us begin by first recalling that the penalized maximum likelihood does indeed have a maximum over all of H. To this end, we first point out that there exists a positive constant C such that for all $f$ in H $$|P(f)| \leq C \|f\|^n e^{-\frac{1}{2}\|f\|^2}. \tag{11}$$

Consequently, we conclude that the function P is bounded above on H by some positive constant B. Let $\{f_l : l \in N\}$, $N = \{1, 2, \ldots\}$ be any sequence of functions in H such that $\lim_{l \to \infty} P(f_l) = B$. Then, for all but a finite number of elements of this sequence, we have that $$\|f_l\| \leq 4 \left( \frac{Cn!}{B} \right)^{1/n}. \tag{12}$$

Therefore some subsequence of $\{f_l : l \in N\}$ converges weakly in H to a maximum of P.

Theorem 1: Suppose H is a reproducing Hilbert space with reproducing kernel $k(\cdot, \cdot)$. If $|P(f)| = \max\{|P(g)| : g \in H\}$ for some f in H then there exist constants $c_i$, $i \in Z_n$ such that for all $x \in R^d$ $$f(x) = \sum_{i \in Z_n} c_i K(x, x^i). \tag{13}$$

Proof: Let $y_i = f(x^i)$, $i \in Z_n$. Since $f$ maximizes $|P(h)|$, $h \in H$, we conclude that $y_i \neq 0$ for $i \in Z_n$. Let g be any other function in H such that $g(x^i) = y_i$, $i \in Z_n$. By the definition of $f$ we have that $$|g(x^1) \ldots g(x^n)| e^{-\frac{1}{2}\|g\|^2} \leq |f(x^1) \ldots f(x^n)| e^{-\frac{1}{2}\|f\|^2}$$

from which we conclude that $$\|f\| = \min\{\|g\| : g(x^i) = y_i, i \in Z_n, g \in H\}.$$

The fact that $f$ has the desired form now follows from a well-known analysis of this problem. We recall these details here. For any constants $a_1, \ldots, a_n$ we have that $$\left| \sum_{i \in Z_n} a_i y_i \right| = \left| < \sum_{i \in Z_n} a_i k(x^i, \cdot), g > \right|$$

$$\leq \left\| \sum_{i \in Z_n} a_i k(x^i, \cdot) \right\| \|g\|$$

which implies that $$\|g\| \geq \max \left\{ \frac{|a^T y|}{\|\sum_{i \in Z_n} a_i k(x^i, \cdot)\|} : a = (a_1, \ldots, a_n)^T \in R^n \right\}. \tag{14}$$

To achieve equality above we choose constants $c_1, \ldots, c_n$ so that the $f$ function defined by $$\tilde{f}(x) = \sum_{i \in Z_n} c_i k(x, x^i), x \in R^n$$

satisfies the equations $y_i = \tilde{f}(x^i)$, $i \in Z_n$. Therefore, we have that $$\|\tilde{f}\|^2 = c^T K c$$

where $K = \{k(x^i, x^j)\}_{i,j \in Z_n}$ and $c = (c_1, \ldots, c_n)^T$. Since $Kc = y$, where $y = (y_1, \ldots, y_n)^T$, we also have that $$\frac{c^T y}{\|\sum_{i \in Z_n} c_i K(x^i, \cdot)\|} = \|\tilde{f}\|.$$

Although the PMLE method allows for a nonparametric view of density estimation it is interesting to see its effect on a standard parametric model, for instance a univariate normal with unknown mean and variance relative to the Sobolev norm on R. To this end, recall the m-th Sobolev norm is defined to be $$\|f\|_m^2 = \int_R |f^{(m)}(t)|^2 dt.$$

For the normal density with mean $\mu$ and variance $\sigma^2$, given by $$f(t) = \frac{1}{\sqrt{2\pi}\sigma} e^{-\frac{(t-\mu)^2}{2\sigma^2}}, t \in R$$

we get that $$\|f\|_m^2 = 2\rho_m \sigma^{-2m-1}$$

where $$\rho_m = \frac{2^{-2m-3}}{\pi} \Gamma\left(m + \frac{1}{2}\right).$$

Then the PMLE estimates for the mean and variance are given by $$\hat{\mu} = \frac{1}{n} \sum_{i \in Z_n} x_i$$

and $$\hat{\sigma} = v$$

where v is the unique positive root of the equation $$v^{2m-1}(v^2 - S^2) = \frac{2m+1}{n} \rho_m$$

and $$S^2 = \frac{1}{n} \sum_{i \in Z_n} (x_i - \hat{\mu})^2.$$

Note that v is necessarily greater than S, but as $n \to \infty$ it converges to S.

Penalized Maximum Likelihood Estimators

In the previous section we provided a justification for our density estimator to have the form $$f(x) = \sum_{i \in Z_n} c_i k(x^i, x), \; x \in R^d \qquad (15)$$

where $k(x,y)$, $x,y \in R^d$ is a reproducing kernel for a Hilbert space of functions on $R^d$. In general, this function is neither nonnegative on $R^d$ nor does it have integral one. We take the point of view that in applications the kernel will be chosen rather than the Hilbert space H. Thus, we will only consider kernels which are nonnegative, that is, $k(x,y) \geq 0$, $x,y \in R^d$.

We note in passing that there are noteworthy examples of Hilbert spaces which have nonnegative reproducing kernels. For example, given any polynomial $$q(t) = q_0 + q_1 t + \ldots + q_m t^m, \; t \in R \qquad (16)$$

which has a positive leading coefficient and only negative zeros it can be confirmed that the Hilbert space of functions $f$ on R with finite norm $$\|f\|^2 = \sum_{j=0}^{m} q_j \int_R |f^{(j)}(t)|^2 dt \qquad (17)$$

is a reproducing kernel Hilbert space with a nonnegative reproducing kernel.

With a given nonnegative kernel we now view the density $f$ in equation (15) as being parametrically defined and now discuss the problem of determining its coefficients $c_1, \ldots, c_n$. Our first choice is to determine these parameters by substituting the functional form of (15) into the penalized maximum likelihood function (10) and maximize the resulting expression. To this end, we let $$b_i = \int_{R^d} k(x, x^i) dx, \; i \in Z_n$$

and introduce the set $$S^n(b) = \{c : c \in R^n, \; b^T c = 1\}.$$

We recall that the n×n matrix $$K = \{k(x^i, x^j)\}_{i,j \in Z_n}$$

is symmetric, positive definite, and has nonnegative elements. Under these conditions our concern is to maximize the function $$P_K(c) = \Pi(Kc) e^{-\frac{1}{2} c^T K c} \qquad (18)$$

over the set $S^n(b)$ where for any $x = (x_1, \ldots, x_n)^T \in R^n$ we set $$\Pi(x) = \prod_{i \in Z_n} x_i,$$

We also use $$\|x\|^2 = \sum_{i \in Z_n} x_i^2$$

for the euclidean norm of x. We adopt the convention that multiplication/division of vectors is done component-wise. In particular, when all the components of a vector $y = (y_1, \ldots, y_n)^T$ are nonzero we set $$\frac{x}{y} := \left( \frac{x_1}{y_1}, \ldots, \frac{x_n}{y_n} \right).$$

For the vector $e/y$ we use the shorthand notation $y^{-1}$, set $$x \cdot y := (x_1 y_1, \ldots, x_n y_n)^T$$

for multiplication of vectors and use the notation $S^n$ for the set $S^n(e)$ which is the standard simplex in $R^n$. If $f$ is a scalar valued function and x a vector all of whose coordinates lie in its domain, we set $f(x) := (f(x_1), \ldots, f(x_n))^T$. When we write $x \geq y$ we mean this in a coordinate-wise sense.

Note that $P_K(c) = P(f)$ where $f$ is the function in equation (15) and P is the penalized likelihood function (10). Also, we use the notation $S^n$ for the set $S^n(e)$ which is the standard simplex in $R^n$.

Theorem 2: Let K be a positive definite matrix with nonnegative elements. Then the function $P_K$ has a unique maximum on any closed convex subset C of $R_+^n$.

Proof: The existence of a maximum is argued just as in the case of the existence of the maximum of the penalized likelihood function P in equation (10) over the Hilbert space H. To demonstrate that the maximum is unique we let $P_\infty$ be the maximum value of $P_K$ on C. Our hypothesis ensures that $P_\infty$ is positive. Suppose the function $P_K$ attains $P_\infty$ at two distinct vectors $c^1$ and $c^2$ in C. Consequently, the vectors $Kc^1$ and $Kc^2$ are in $\text{int} R_+^n$. Therefore, for any $0 \leq t \leq 1$ the vector $K(tc^1 + (1-t)c^2)$ is likewise in $\text{int} R_+^n$. A direct computation of the Hessian of $P_K$ at x, denoted by $\nabla^2 \log P_K(x)$ verifies, for any vector $x, y \in R^n$ with $Kx \in (R \setminus \{0\})^n$ that $$y^T \nabla^2 P_K(x) y = -\left\| \frac{Ky}{Kx} \right\|^2 - y^T K y < 0.$$

Choosing $y = c^1 - c^2$ and $c = c^2$ we conclude from the above formula that the function $\log P_K(tc^1 + (1-t)c^2)$ is strictly concave for $0 \leq t \leq 1$. But this contradicts the fact that its value at the endpoints are the same.

Remark: Observe that without the condition that K is nonsingular $P_K$ will in general have more than one maximum. For example, when $n=2$, $b=(1,1)^T$ and $$K = \begin{pmatrix} 1 & 1 \\ 1 & 1 \end{pmatrix}$$

$P_K$ is everywhere equal to $e^{-1/2}$ on $S^2(b)$. In general, the proof above reveals the fact that if $P_K$ achieves its maximum at two vectors $c^1$ and $c^2$ in C then $K(c^1 - c^2) = 0$.

If the maximum of $P_K$ on $S^n(b)$ occurs in the interior of $S^n(b)$ at the vector c then it is uniquely determined by the stationary equation $$K(c - (Kc)^{-1}) = \lambda b$$

where $\lambda$ is a scalar given by the equation $$\lambda = c^T K c - n.$$

In the case that K is a diagonal matrix, that is, $K = \text{diag}(k_{11}, \ldots, k_{nn})$ where $k_{ii} > 0$, $i \in Z_n$ the maximum of $P_K$ on $S^n(b)$ occurs at the vector c whose coordinates are all positive and given by the equation $$c_i = \frac{\lambda + \sqrt{\lambda^2 + 4k_{ii}}}{2k_{ii}}, i \in Z_n$$

where $\lambda$ is the unique real number that satisfies the equation $$1 = \sum_{i \in Z_n} \frac{\lambda + \sqrt{\lambda^2 + 4k_{ii}}}{2k_{ii}}. \qquad (19)$$

We remark that the right hand side of equation (19) is an increasing function of $\lambda$ which is zero when $\lambda = -\infty$ and infinity when $\lambda = \infty$.

Theorem 3: Suppose K is an n×n positive definite matrix with nonnegative elements such that Ke=e. Then the vector $$\frac{1}{n}e$$

is the unique maximum of $P_K$ on $S^n$.

Proof: For any $c \in S^n$ the geometric inequality implies that $$\{P_K(c)\}^{1/n} \leq \frac{1}{n} e^T Kc e^{-\frac{1}{2n}c^T Kc}.$$

Moreover, since $e^T Kc = e^T c = 1$ the Cauchy Schwarz inequality implies that $1 \leq n c^T Kc$. Therefore $$\{P_K(c)\}^{1/n} \leq \frac{1}{n} e^{-\frac{1}{2n^2}} = \left\{P_K\left(\frac{1}{n}e\right)\right\}^{1/n}.$$

We now consider the following problem. Starting with a vector $c = (c_1, \ldots, c_n)$ in intS$^n$(b) which is not the maximum of $P_K$ we seek a vector $v = (v_1, \ldots, v_n)^T$ in intS$^n$(b) such that $P_K(v) > P_K(c)$. That is, "updating" c with v will increase $P_K$ and therefore eventually converge to the maximum of $P_K$ on $S^n$(b). To this end, we consider the quantity $\log P_K(v) - \log P_K(c)$. We shall bound it from below by using Jensen's inequality which ensures for any vector $a \in intR_+^n$ and $z \in S^n$ that $\log z^T a \geq z^T \log a$. To make use of this fact we define for any fixed $i \in Z_n$, vectors $z^i \in S^n$, and $a \in intR_+^n$ the equations $$(z^i)_j = \frac{K_{ij}c_j}{(Kc)_i}, j \in Z_n$$

and $$a = \frac{v}{c}.$$

Also, we set $$y = \sum_{i \in Z_n} z^i$$

and note that the vector $$\frac{1}{n}y$$

is in intS$^n$ since K is a nonsingular matrix with nonnegative elements and the vector c is in $R_+^n$. Therefore, we get that $$\log P_K(v) - \log P_K(c) = \sum_{i \in Z_n} \log \frac{(Kv)_i}{(Kc)_i} - \frac{1}{2}v^T Kv + \frac{1}{2}c^T Kc$$

$$= \sum_{i \in Z_n} \log(z^i)^T a - \frac{1}{2}v^T Kv + \frac{1}{2}c^T Kc$$

$$\geq y^T \log a - \frac{1}{2}v^T Kv + \frac{1}{2}c^T Kc.$$

This inequality suggests that we introduce the auxiliary function $$W(v) = y^T \log v - \tfrac{1}{2} v^T K v, \ v \in intR_+^n$$

and rewrite the above inequality in the form $$\log P_K(v) - \log P_K(c) \geq W(v) - W(c).$$

This function W is strictly log concave on intR$_+^n$ and tends to minus infinity on its boundary. Therefore it has a unique maximum in intS$^n$(b). Using the principle of Lagrange multipliers there exists a constant $\gamma$ such that the vector v at which W takes its maximum in intS$^n$(b) is characterized by the equation $$y/v - Kv - \gamma b = 0.$$

Taking the inner product of both sides of this equation with v and using the fact that $v \in intS^n(b)$ yields the equation $$\gamma = n - v^T K v.$$

We formalize these remarks in the following theorem.

Theorem 4: Let K be a symmetric positive definite matrix with nonnegative elements and $b \in intR_+^n$. Given any vector $c \in intS^n(b)$ there exists a unique vector $v \in intS^n(b)$ satisfying the equations $$v \cdot Kv = K((Kc)^{-1} \cdot c - \gamma v \cdot b \qquad (20)$$

where $$\gamma = n - v^T K v. \qquad (21)$$

This vector has the property that $P_K(v) > P_K(c)$ as long as c is not the unique maximum of $P_K$ on $S^n(b)$.

The function H defined by the equation $H(c) = v$, $v \in intS^n(b)$ maps $S^n(b)$ into itself. By the uniqueness of v satisfying (20) we see that H is continuous. The mapping H has a continuous extension $S^n(b)$ to and by the Browder fixed point theorem has a fixed point in $S^n(b)$ at some vector u. This vector satisfies the equation $$u \cdot Ku = K((Ku)^{-1}) \cdot u - \gamma u \cdot b.$$

These equations by themselves do not define the unique maximum of $P_K$ on $S^n(b)$. If we call this vector c then it is the unique solution of the equations $$K((Kc)^{-1} - c) = \gamma b - z,$$

where $\gamma$ is a scalar given by the equation $$\gamma = n - c^T K c$$

and z is a vector in $R_+^n$ satisfying the equation $z \cdot c = 0$. To derive this fact we recall that a concave function $f$ has its maximum on $S^n(b)$ at x if and only if there is a $\gamma \in R$ and $az \in R_+^n$ such that $z^T x = 0$ and $\nabla f(x) = \gamma b - z$. Specializing this general fact to the case at hand verifies the above fact. In general the maximum of $P_K$ may occur on the boundary of $S^n(b)$.

The iteration embodied in the above result is quite appealing as it guarantees an increase in the penalized likelihood function $P_K$ at each step unless we have reached its maximum on $S^n(b)$. However, to compute the updated vector seems computationally expensive and so we consider other methods for maximizing $P_K$ over $S^n(b)$.

To this end, we recall that whenever a function F is a homogenous polynomial with positive coefficients then the Baum Welch algorithm says that the update formula $$v = \frac{c \cdot \nabla F(c)}{(b \cdot c)^T \nabla F(c)}$$

increases F on $S^n(b)$, i.e. $F(v) > F(c)$ whenever $c \in S^n(b)$ is not the maximum of F on $S^n(b)$, see L. E. Baum and J. A. Eagon, cited above. Since $P_K$ is not a polynomial, applying the Baum Welch iteration to it will generally not increase it. One modification of the Baum Welch iteration which we have some computational experience with starts with a positive parameter $\sigma$ and defines $$v = \frac{c \cdot K((Kc)^{-1} - \sigma e)}{n - \sigma c^T K c}.$$

This update formula is inexpensive to use and our numerical experiments indicate it gives good results provided that $\sigma$ is chosen with care.

Using the strong duality theorem for convex programs, cf. S. Whittle, "Optimization under Constraints," *Wiley Interscience*, 1971, the dual minimization problem for the primal convex program of minimizing $-\log P_K$ over the domain $$W := S^n(b) \cap A^{-1}(\text{int} R_+^n)$$

is $$\min\{-\log P_K(y) : y \in W\} = \max\{\theta(u,t) : u \in R_+^n, t \in R\}$$

where $$\theta(u,t) := \min\{\tfrac{1}{2} x^T A x - u^T x + t(b^T x - 1) : x \in A^{-1}(\text{int} R_+^n)\}.$$

However, the dual problem does not seem to offer any advantage over the primal. Interior point methods seem to have a strong potential to handle the primal problem when K is a large sparse matrix. It is interesting to note that our primal problem falls into the problem class studied in K. Tok, "Primal-dual path-following algorithms for determinant maximization problems with linear matrix inequalities," *Computational Optimization and Applications*, Kluwer Academic Publishers, Boston.

We end this section with a number of comments on the problem of maximizing $P_K$ over the positive orthant $R_+^n$. This problem has some unexpected connections with the problem of the diagonal similarity of a symmetric matrix with nonnegative elements to a doubly stochastic matrix. We record below the information we need about this problem.

The following lemma is well known, cf. M. Marcus and M. Newman, cited above; R. Sinkhorn, cited above, and is important to us. Recall that an n×n matrix A is said to be strictly copositive provided that $x^T A x > 0$ for all $x \in R_+^n \setminus \{0\}$, cf. C. A. Micchelli and A. Pinkus, cited above, and references therein.

Lemma 1: Let A be an n×n symmetric strictly copositive matrix. For any vector $y \in \text{int} R_+^n$ there exists a unique vector $x \in \text{int} R_+^n$ such that $$x \cdot A x = y. \tag{22}$$

Proof: First we prove the existence of a vector x which satisfies (22). To this end, we follow A. W. Marshall and I. Olkin, cited above, and consider the set $$H^n(y) := \{u : u \in \text{int} R_+^n, \Pi(u^y) = 1,\}$$

where $u^y = (u_1^{y_1}, \ldots, u_n^{y_n})^T$, $y = (y_1, \ldots, y_n)^T$, and $u = (u_1, \ldots, u_n)^T$. By hypothesis, there exists some $\rho > 0$ such that for all $u \in R_+^n$ the inequality $u^T A u \geq \rho u^T u$ holds. Thus, the function $\tfrac{1}{2} u^T A u$ takes on its minimum value on $H^n(y)$ at some z. Therefore, by Lagrange multipliers there is a constant $\mu$ such that $$Az = \mu y/z.$$

Since $0 < z^T A z = (e^T y)\mu$ we see that $\mu > 0$ and so the vector we want is given by $x = z/\sqrt{\mu}$. This establishes the existence of x. Note that the vector $$u = \frac{x}{(\Pi(x^y))^{\frac{1}{e^T y}}}$$

the unique vector in $H^n(y)$ which minimizes $\tfrac{1}{2} u^T A u$ on $H^n(y)$.

The uniqueness of x in (22) is established next. Suppose there are two vectors $z^1$ and $z^2$ which satisfy equation (22). Let B be an n×n matrix whose elements are defined to be $$B_{ij} = \frac{z_i^2}{y_i} A_{ij} z_j^2, \; i, j \in Z_n.$$

Then (22) implies that $$Be = e, \tag{23}$$

and $$Bv = v^{-1}, \tag{24}$$

when $v := z^1/z^2$. Let $M := \max\{v_j : j \in Z_n\} = v_r$ and $m := \min\{v_j : j \in Z_n\} = v_s$ for some $r, s \in Z_n$. From (23) and (24) we obtain that $$\frac{1}{m} = \frac{1}{v_s} = (Bv)_s \leq M \tag{25}$$

and also $$\frac{1}{M} = \frac{1}{v_r} = (Bv)_r \geq m. \tag{26}$$

Thus we conclude that $Mm = 1$ and from (25) that $(B(v - Me))_s = 0$. Since $B_{ss} > 0$ we get $m = v_s = M$. Therefore, $m = M = 1$ which means $v = e$; in other words, $z^1 = z^2$.

We shall apply this lemma for the Baum Welch update for the problem of maximizing the function $P_K$ given in (18) over the positive orthant $R_+^n$, but first we observe the following fact.

Theorem 5: Let K be a symmetric positive definite matrix with nonnegative entries. Then $P_K$ achieves its (unique) maximum on $R_+^n$ at the (unique) vector $x = (x_1, \ldots x_n)^T$ in $\text{int} R_+^n$ which satisfies the equation $$x \cdot Kx = e. \tag{27}$$

Proof: Let c be any vector in $R^n$ such that $Kc \in (R \setminus \{0\})^n$. Since $$\nabla P_K(c) = P_K(c) K(c - (Kc)^{-1}),$$

we see that the vector which satisfies (27) is a stationary point of $P_K$. We already proved that $P_K$ is log concave and so the result follows.

Note that when K satisfies the hypothesis of Theorem 3 the vector x in equation (27) is e and moreover it furnishes the maximum of $P_K$ on $S^n$. In the next result we clarify the relationship between the minimum problem in Lemma 1 and the problem of maximizing $P_K$ over $R_+^n$. For this purpose, we use the notation $H^n$ for the set $H^n(e)$.

Theorem 6: Suppose that K is an n×n symmetric positive definite matrix with nonnegative elements. Let $$p_K := \max\{P_K(c) : c \in R_+^n\}$$

and $$q_K := \min\{\tfrac{1}{2} u^T K u : u \in H^n\}.$$

Then $$p_K = \left(\frac{2q_K}{ne}\right)^{n/2}.$$

Proof: Let x be the unique vector in the interior of $R_+^n$ such that $$x \cdot Kx = e.$$

Since x is a stationary point of $P_K$ we have that $$p_K = \Pi(Kx) e^{-\tfrac{1}{2} x^T K x}.$$

Moreover, the vector $$u = \frac{x}{(\Pi(x))^{1/n}}$$

in $H^n$ is the unique solution of the minimum problem which defines the constant $q_K$. Thus, $$2q_K = u^T K u = \frac{n}{(\Pi(x))^{2/n}}$$

and $$p_K = \frac{e^{-n/2}}{\Pi(x)}.$$

Eliminating $\Pi(x)$ from these equations proves the result.

This result justifies the exchange in the max and min in the following result. To this end, we introduce the semi-elliptical region $$E_K^n = \{c : c \in R_+^n, c^T K c = 1\}.$$

Theorem 7: Suppose K is an n×n symmetric positive definite matrix with nonnegative elements. Then $$\max\{\min\{u^T K c : u \in H^n\} : c \in E_K^n\} = \min\{\max\{u^T K c : u \in H^n\} : c \in E_K^n\}.$$

To prove this fact we use the following consequence of the arithmetic geometric inequality.

Lemma 2: For any $x \in R_+^n$ we have that $$(\Pi(x))^{1/n} = \min\left\{\frac{1}{n} u^T x : u \in H^n\right\}.$$

Proof: By the arithmetic geometric inequality we have $$\frac{1}{n} u^T x \geq \left(\prod_{i \in Z_n} u_i x_i\right)^{1/n} = \Pi(x)^{1/n} \qquad (28)$$

provided that $\Pi(u) = 1$. This inequality is sharp for the specific choice $u = \Pi(x)^{1/n} x^{-1}$.

Proof of Theorem 7: First, we observe that $$p_K^{1/n} = \max\left\{\max\left\{\Pi(Kc)^{\tfrac{1}{n}} e^{-\tfrac{1}{2n} c^T K c} : c \in \sqrt{t} E_K^n\right\} : t \in R_+\right\}$$

$$= \max\left\{e^{-\tfrac{t}{2n}} \sqrt{t} : t \in R_+\right\} \cdot \max\{\Pi(Kc)^{1/n} : c \in E_K^n\}$$

$$= \frac{1}{\sqrt{ne}} \max\{\min\{u^T K c : u \in H^n\} : c \in E_K^n\}.$$

Next, we observe by the Cauchy Schwarz inequality that $$\sqrt{\frac{2q_K}{ne}} = \frac{1}{\sqrt{ne}} \min\{\sqrt{u^T K u} : u \in H^n\}$$

$$= \frac{1}{\sqrt{ne}} \min\{\max\{u^T K c : c \in E_K^n\} : u \in H^n\}.$$

We remark that (27) implies that $x \in \sqrt{n} E_K^n$ when K satisfies the conditions of Theorem 5. Let us show directly that this is the case for any maxima of $P_K$ on $R_+^n$ even when K is only symmetric semi-definite. This discussion shall lead us to a Baum Welch update formula for maximizing $P_K$ on $R_+^n$ even when K is only symmetric semi-definite.

Suppose v is any maximum of $P_K$ in $R_+^n$. Then for any $t \geq 0$ $$P_K(tv) = t^n \Pi(Kv) e^{-t^2 \gamma} \leq P_K(v) = \Pi(Kv) e^{-\gamma}$$

$\gamma := \tfrac{1}{2} v^T K v$. Thus the function $h(t) := P_K(tv)$, $t \in R_+$ achieves its maximum on $R_+$ at $t = 1$. However, a direct computation confirms that its only maximum occurs at $$\sqrt{\frac{n}{2\gamma}}.$$

Thus, we have confirmed that $v \in \sqrt{n} E_K^n$. Let $$\hat{c} = \frac{v}{\sqrt{n}} \qquad (29)$$

and observe that for every vector $c \in E_K^n$ $$\Pi(Kc) \leq \Pi(K\hat{c}).$$

Thus, the vector $\hat{c}$ maximizes the function $M_K(c) := \Pi(Kc)$ over $E_K^n$. Conversely, any vector c defined by equation (29), which maximizes $M_K$ over $E_K^n$, maximizes $P_K$ over $R_+^n$. Thus it suffices to consider the problem of maximizing the homogenous polynomial $M_K$ over the semi-elliptical set $E_K^n$.

Before turning our attention to this problem, let us remark that the function $M_K$ has a unique maximum on $E_K^n$ whenever K is a positive definite matrix with nonnegative elements. To see this, we observe that the Hessian of log $M_K$ at any vector $c \in E_K^n$ with $Kc \in intR_+^n$ is negative definite. This fact is verified by direct computation as in the proof of Theorem 2, see also Theorem 10. Thus, $M_K$ has a unique maximum on the convex set $$\hat{E}_K^n = \{c : c \in R_+^n, c^T K c \leq 1\}.$$

Suppose that the maximum Of $M_K$ in $\hat{E}_K^n$ occurs at u while its maximum on $E_K^n$ is taken at v. Then, by the homogeneity of $M_K$ we have that $$M_K(v) \leq M_K(u) \leq (u^T K u)^{n/2} M_K(v) \leq M_K(v).$$

Hence $u^T K u = 1$ and v must be the maximum of $M_K$ in $\hat{E}_K^n$ as well. That is, $u=v$ and v is unique. We now study the problem of maximizing $M_K$ over $E_K^n$ in the following general form.

To this end, let G be any function of the form $$G(x) = \sum_{i \in Z_+^n} g_i x^i, \; x \in E_K^n$$

where $g_i$, $i \in Z_+^n$ are nonnegative scalars. We require that the sum be convergent in a neighborhood of $E_K^n$. Also, there should be at least one $j \in intZ_+^n$ such that $g_j > 0$. Certainly the function $M_K$ has all of these properties when K is a nonsingular matrix with nonnegative elements, which covers the case that interests us.

For $x \in E_K^n$ we have that $$x \cdot \nabla G(x) \geq j g_j x^j,$$

and so $x \cdot \nabla G(x) \in intR_+^n$. Consequently, the vector z, defined by the equations $$z = \frac{x \cdot \nabla G(x)}{x^T \nabla G(x)}$$

is $intS^n$. Using Lemmna 1 there is a unique vector y in the interior of $intE_K^n$ such that $y \cdot Ky = z$. We claim that $$G(x) \leq G(y). \tag{30}$$

To confirm this we consider the function $$Q(v) := \sum_{i \in Z_+^n} \frac{(i^T \log v) g_i x^i}{x^T \nabla G(x)} = z^T \log v, \; v \in \text{int } E_K^n.$$

Since $z \in intR_+^n$, Q has a maximum in int $E_K^n$. Suppose that the maximum of Q occurs at $w \in intE_K^n$. Thus, by Lagrange multipliers there is a constant $\rho$ such that $$\frac{z}{w} = \rho K w.$$

Since $w \in E_K^n$ and $z \in S^n$ we have $\rho = 1$. Thus, we see that $w = y$ is the unique maximum of Q. Hence we have shown that $$Q(y) \geq Q(x) \tag{31}$$

where equality is strict in (31) unless $y = x$.

Next, we use Jensen's inequality to conclude that $$\log \frac{G(y)}{G(x)} = \log \left\{ \sum_{i \in Z_+^n} \frac{y^i}{x^i} \frac{g_i x^i}{G(x)} \right\}$$

$$\geq \sum_{i \in Z_+^n} \left( \log \frac{y^i}{x^i} \right) \frac{g_i x^i}{G(x)}$$

$$= \frac{(Q(y) - Q(x)) x^T \nabla G(x)}{G(x)}.$$

Hence, we have established (30) and moreover have demonstrated that equality holds in (30) if and only if $y = x$. That is, if and only if $x \in E_K^n$ satisfies the equation $$Kx = \frac{\nabla G(x)}{x^T \nabla G(x)}.$$

This is the equation for the stationary values for G over the set $E_K^n$. In the case that interests us, namely, for $G = M_K$, the stationary equations have a unique solution in $E_K^n$ at the maximum of $M_K$. For this case we summarize our observations in the next result.

Theorem 8: Suppose K is a symmetric positive definite matrix with nonnegative elements. Given an $x \in \sqrt{n} \, intE_K^n$ choose $y \in \sqrt{n} \, intE_K^n$ such that $$y \cdot (Ky) = x \cdot K((Kx)^{-1}).$$

Then $P_K(y) > P_K(x)$ unless $x = y$.

Using this result we generate a sequence of vectors $x^k \in \sqrt{n} \, intE_K^n$, $k \in N$ by the equation $$x^{k+1} \cdot K x^{k+1} = x^k \cdot K((Kx^k)^{-1}), \tag{32}$$

so that the sequence $\{x^k : k \in N\}$ either terminates at a finite number of steps at the vector satisfying (27) or converges to it as $k \to \infty$. Moreover, in the latter case $P_K(x^k)$ monotonically increases to the maximum of $P_K$ in $R_+^n$. This theorem gives a "hill climbing" iterative method of the type used to train Hidden Markov Models, cf. L. E. Baum, T. Petrie, G. Soules, and N. Weiss, cited above; F. Jelinek, cited above. However, the equation (32) must be solved numerically. Therefore, it is much simpler to use equation (27) directly to find the maximum of $P_K$ on the set $R_+^n$.

A naive approach to find the unique solution to (27) is to define vectors $c^r$, $r \in N$ by the iteration $$c^{r+1} = (Kc^r)^{-1}, \; r \in N. \tag{33}$$

In general this iteration will diverge. For example, when $K=4I$ and the initial vector is chosen to be $c^1=e$, then for all $r \in N$ we have that $c^r = 2^{1+(-1)^r} e$ which obviously does not converge to the maximum of $P_K$, which occurs at the vector whose coordinates are all equal to a half.

To avoid this difficulty we consider the iteration $$c^{r+1} = \sqrt{\frac{c^r}{Kc^r}}, \; r \in N. \tag{34}$$

Note that iteration (34) maps $intR_+^n$ into itself. Therefore, we always initialize the iteration with a vector in $intR_+^n$. The thought which led us to equation (34) was motivated by the apparent deficiencies of the iteration (33). Later we realized the connection of equation (34) to the Sinkhorn iteration, see R. Sinkhorn, cited above; R. Sinkhorn and P. Knopp, cited above, which we now explain.

We can rewrite this vector iteration as a matrix equation. To this end, we set $$K_{ij}^r := c_i^r K_{ij} c_j^r, \, i,j \in Z_n, \, r \in N.$$

Then equation (34) implies that $$K_{ij}^{r+1} = \frac{K_{ij}^r}{\sqrt{s_i^r s_j^r}}, \, i, j \in Z_n, r \in N$$

where $$s_i^r := \sum_{j \in Z_r} K_{ij}^r, \, i \in Z_n.$$

Thus, the components of the vectors $c^r$, $r \in N$ generate a sequence of positive definite matrices $K^r$, $r \in N$, initialized with the matrix K, by a balanced column and row scaling. This iteration preserves symmetry of all the matrices, in contrast to the method of R. Sinkhorn, cited above; R. Sinkhorn and P. Knopp, cited above.

Next, we define for $r \in N$, $w^r = c^r \cdot (Kc^r)$, $m^r = \min\{w_i^r : i \in Z_n\}$, $M^r = \max\{w_i^r : i \in Z_n\}$ and observe the following fact.

Lemma 3: Let K be an n×n matrix with nonnegative entries. Then the sequence $M^r/m^r$, $r \in N$ is nondecreasing. Moreover, if $k_{ij} > 0$ for $i,j \in Z_n$ then it is strictly decreasing.

Proof: For any $r \in N$ we have the equations $$w^{r+1} = c^{r+1} \cdot Kc^{r+1} \tag{35}$$

$$= \frac{c^r}{\sqrt{c^r \cdot Kc^r}} \cdot K\left(\frac{c^r}{\sqrt{c^r \cdot Kc^r}}\right)$$

$$= \frac{c^r}{\sqrt{w^r}} \cdot K\left(\frac{c^r}{\sqrt{w^r}}\right)$$

from which it follows that $$w^{r+1} \leq \frac{1}{\sqrt{m^r}} \frac{c^r}{\sqrt{w^r}} \cdot Kc^r \tag{36}$$

$$\leq \frac{1}{\sqrt{m^r}} \sqrt{w^r}$$

and also $$w^{r+1} \geq \frac{1}{\sqrt{M^r}} \sqrt{w^r}. \tag{37}$$

In particular, we get $$M^{r+1} \leq \sqrt{\frac{M^r}{m^r}}, \tag{38}$$

$$m^{r+1} \geq \sqrt{\frac{m^r}{M^r}} \tag{39}$$

and we conclude that the ratio $M^r/m^r$ is nondecreasing in r. Furthermore, if all the components of the vector $c^r$ and elements of the matrix K are positive we see that the sequence is decreasing.

Note that the sequence of vectors $c^r$, $r \in N$ given by (34) are bounded independent of r if $k_{ii} > 0$, $i \in Z_n$. Specifically, we set $\kappa = \min\{k_{ii} : i \in Z_n\}$ and observe for $r \in N$ that $c^r \leq \kappa^{-\frac{1}{2}}e$. In addition, the maximum norm satisfies the bound $\|c^r\|_\infty \geq \rho^{-\frac{1}{2}}$ where $\rho$ is the largest eigenvalue of K. To see this we recall that $$\rho = \max\left\{\min\left\{\frac{(Kx)_i}{x_i} : i \in Z_n, x_i \neq 0\right\} : x = (x_1, \ldots, x_n)^T \in R_+^n \setminus \{0\}\right\},$$

cf. R. A. Horn and C. R. Johnson, Matrix Analysis, Cambridge University Press, Cambridge, U.K. 1985, page 504, from which the claim follows by induction.

The iteration (34) can be accelerated by computing intermediate vectors $v^r$, $r \in N$ $$c_i^{r+1} = \sqrt{\frac{c_i^r}{v_i^r}}, \, i \in Z_n$$

where $$v_i^k = \sum_{j=1}^{i-1} k_{ij} c_j^{k+1} + \sum_{j=1}^{n} k_{ij} c_j^k, \, i \in Z_n.$$

Maximum Likelihood Estimation

In this section we consider another method for determining the constants $c_1, \ldots, c_n$ for the density estimator given in equation (15). Here we take a parametric density estimation perspective. Thus, we study the problem of maximizing the likelihood function $$\prod_{i \in Z_n} f(x^i)$$

over the simplex $S^n$ where $f$ has the functional form (15). In other words, we desire to maximize $L_K(c) = \Pi(Kc)$ for all $c \in S^n$. A problem of this type arises in the method of detailed interpolation which is widely used in language modeling for speech recognition, see L. R. Bahl, P. F. Brown, P. V. de Souza, R. L. Mercer, D. Nahamoo, cited above. In fact, in this application the matrix K has more rows than columns. With this in mind we study the problem of maximizing $L_K$ in greater generality than dealt with so far. To distinguish this case from the one considered in the previous section we adopt a slightly different notation in this section. We begin with a n×k matrix A with nonnegative entries and consider the problem of maximizing the homogeneous polynomial of total degree at most n given by $$M_A(x) = \Pi(Ax), \, x \in R^k \tag{40}$$

over the simplex $$S^k = \{x : x \in R_+^k, \, e^T x = 1\}.$$

Note that even when A is a nonsingular square matrix the likelihood function $M_A$ may take on its maximum on the boundary of $S^n$. For example, corresponding to the matrix $$A = \begin{pmatrix} 1 & 3 \\ 1 & 1 \end{pmatrix}$$

the maximum of $M_A$ occurs at $c = (0,1)^T \in S^2$.

The fact that $M_A$ is a homogenous polynomial suggests that we use the Baum Welch algorithm to maximize it over $S^k$. To this end, we specialize the Baum Welch algorithm to our context.

Theorem 9: Suppose A is an n×k matrix with nonzero rows and nonnegative elements. For every c∈intS$^k$ the vector ĉ whose coordinates are defined by the equation $$\hat{c} = \frac{c}{n} \cdot A^T((Ac)^{-1})$$

is likewise in intS$^k$. Moreover $M_A(\hat{c}) \geq M_A(c)$ where strict inequality only holds unless $M_A$ takes on its minimum on S$^k$ at the vector c.

Proof: Since $M_A$ is a homogenous polynomial of degree n with nonnegative coefficients we can appeal to a result by L. E. Baum and J. A. Eagon, cited above, that states that the vector c whose components are defined by the equation $$\hat{c} = \frac{c \cdot \nabla M_A(c)}{n M_A(c)}$$

has all the required properties. We leave it to the reader to verify that c has the desired form.

Under the conditions of the above theorem we point out that the Baum Welch algorithm globally converges.

Theorem 10: Let A be an n×k matrix of rank k satisfying the hypothesis of Theorem 9. Then $M_A$ has a unique maximum on S$^k$ and the Baum Welch algorithm with any initial vector in int S$^k$ converges to this maximum.

Proof: The main point of the proof is the observation that $M_A$ is log concave since for any vectors c, y in R$^k$ with Ac∈ℝ\{0})$^n$ we have that $$y^T \nabla^2 \log M_A(c) y = -\left\| \frac{Ay}{Ac} \right\|^2. \tag{41}$$

As in the case of our study of the penalized likelihood function $P_K$ we give a sufficient condition on an n×n matrix A such that $M_A$ achieves its maximum on S$^n$ at the vector $$\frac{1}{n}e.$$

Theorem 11: Suppose A is an n×n symmetric matrix with nonnegative elements such that Ae=μe for some positive number μ. Then $M_A$ has its unique maximum on S$^n$ at the vector $$\frac{1}{n}e.$$

Proof: By the arithmetic geometric inequality we have for any c∈S$^n$ that $$\{M_A(c)\}^{1/n} \leq \frac{1}{n} e^T A c = \frac{\mu}{n} = \left\{ M_A\left(\frac{1}{n}e\right) \right\}^{1/n}.$$

In the spirit of the previous section, we describe a problem which is due to the problem of maximizing $M_A$ over S$^k$. To present the result we introduce for every ρ∈R$_+$ the set $$G_\rho^n = \{u: u \in R_+^n, \Pi(u) \geq 1, e^T u \leq \rho\},$$

and for ρ=∞ we denote this set by G$^n$. We also need the set $$S_\rho^k = \{c: c \in S^k, Ac \geq \rho e\}.$$

Note that both of the sets $G_\rho^n$ and $S_\rho^k$ are nonempty convex and compact sets when ρ is not infinite.

Theorem 12: Let A be an n×k matrix with nonnegaitve elements such that each column has at least one nonzero element. Then $$\max\{M_A(c): c \in S^k\} = \frac{1}{n}\min\{\|A^T u\|_\infty : u \in G^n\}. \tag{42}$$

For this proof we use the min max theorem of von Neuman, cf. C. Berge and A. Ghouile-Houri, Programming, Games and Transportation Networks, John Wiley, New York, pp. 65–66, 1965, which we repeat here for the convenience of the reader.

Theorem 13: Let U and V be compact nonempty convex sets in R$^n$ and R$^k$ respectively. If ƒ(x,y) is a function on R$^n$×R$^k$ that is upper semi-continuous and concave with respect to x and lower semi-continuous and convex with respect to y then $$\max_{x \in U} \min_{y \in V} f(x,y) = \min_{y \in V} \max_{x \in U} f(x,y).$$

Proof of Theorem 12: We first prove the theorem under the hypothesis that all the elements of A are positive. Therefore, for all E sufficiently small $$\max\{M_A(c): c \in S^k\} = \max\{M_A(c): c \in S_\epsilon^k\}.$$

Hence, by Lemma 2 we have that $$(\max\{M_A(c): c \in S^k\})^{1/n} = \frac{1}{n}\max\{\min\{u^T Ac : u \in G^n\} : c \in S_\epsilon^k\}.$$

Using the fact that A(S$_\epsilon^k$) is a bounded subset of int R$_+^n$ we get that the right hand side of the above equation equals $$\frac{1}{n}\max\{\min\{u^T Ac : u \in G_\rho^n\} : c \in S_\epsilon^k\}$$

for all ρ sufficiently large. By the von Neuman minmax theorem this quantity equals $$\frac{1}{n}\min\{\max\{(A^T u)^T c : c \in S_\epsilon^k\} : u \in G_\rho^n\}.$$

Observe that for a fixed u the maximum over c in S$^k$ occurs at a vector all of whose coordinates are zero except for one coordinate. Since A has all positive elements this vector will be in S$_\epsilon^k$ for all ε sufficiently small. Hence the right hand side of the above equation equals $$\frac{1}{n}\min\{\|A^T u\|_\infty : u \in G_\rho^n\}.$$

But for ρ sufficiently large this equals $$\frac{1}{n}\min\{\|A^T u\|_\infty : u \in G^n\}.$$

This establishes the result for the case that A has all positive elements. Obviously, any A that satisfies the hypothesis of the Theorem can be approximated arbitrarily closely by matrices with all positive elements. Since both sides of equation (42) are continuous functions of A the result follows.

Degree Raising Instead of Baum Welch

In this section we compute the maximum of $M_A$ over the simplex S$^k$ using the notion of degree raising, cf. C. A.

Micchelli, cited above. This method provides an interesting alternative to the Baum Welch algorithm described in the previous section. The method proceeds in two steps. The first step of this alternate procedure requires writing $M_A$ as a linear combination of monomials. Thus, there are constants $\{a_i : i \in Z_n^k\}$ such that $$M_A(x) = \sum_{i \in Z_n^k} \binom{n}{i} a_i x^i, x \in R^k$$

where $$Z_n^k := \left\{ i : i = (i_1, \ldots, i_k)^T, |i| = \sum_{j=1}^k i_j = n \right\}.$$

The sequence $\{a_i : i \in Z_n^k\}$ can be computed iteratively in the following way. For $m \in Z_n$ we define sequences $\{b_i^m : i \in Z_m^k\}$ by the formula $$\prod_{j \in Z_m} (Ax)_j = \sum_{i \in Z_m^k} b_i^m x^i, x \in R^k.$$

Thus, for $m \in Z_n$ $$b_j^{m+1} = \sum_{j=1}^k A_{m+1,j} b_{j-e^j}^m, j \in Z_{m+1}^k$$

where $e^1, \ldots, e^k$ are the coordinate vectors in $R^k$ defined by $$e_r^j = \delta_{j,r} j, r \in Z_k.$$

$$b_i^1 = A_{1,i}, i \in Z^k.$$

In particular, we have that $$b_i^n = \binom{n}{i} a_i, i \in Z_n^k.$$

Note that by the binomial theorem the quantity $$\|M_A\|_\infty = \max\{|M_A(x)| : x \in S^k\}$$

does not exceed $$\max\{|a_i| : i \in Z_n^k\}$$

so our "first guess" for $\|M_A\|_\infty$ is $\max\{|a_i| : i \in Z_n^k\}$. Moreover, by the arithmetic geometric inequality the function $x^i$, $x \in R^k$ has its maximum on $Z_n^k$ at $i/n$, and so our "first guess" for the maximum of $M_A$ will be $x = j/n$ where $$j = \text{argmax}\{|a_i| : i \in Z_n^k\}.$$

To improve this initial guess, we use degree raising.

For any nonnegative integer r, $M_A$ is also a homogenous polynomial of degree n+r. Hence, there are constants $\{a_i^r : i \in Z_{n+r}^k\}$ such that $$M_A(x) = \sum_{i \in Z_{n+r}^k} \binom{n+r}{i} a_i^r x^i, x \in R^k$$

It is proved in C. A. Micchelli and A. Pinkus, cited above, that the sequence $\max\{|a_i^r| : i \in Z_{n+r}^k\}$ is nondecreasing in $r \in N$ and converges to $\|M_A\|_\infty$ at the rate $O(1/r)$. Moreover, if $j_r \in Z_{n+r}^k$ is defined by $$j_r = \text{argmax}\{|a_i^r| : i \in Z_{n+r}^k\}$$

then $j_r/(n+r)$ is an approximation to $$\text{argmax}\{|M_A(x)| : x \in S^k\}.$$

The sequence $\{a_i^r : i \in Z_{n+r}^k\}$ can be recursively generated by the formula $$a_i^{r+1} = \frac{1}{n+r+1} \sum_{j=1}^k i_j a_{i-e^j}^r, i = (i_1, \ldots, i_k)^T \in Z_{n+r+1}^k$$

where $a_i^0 = a_i, i \in Z_r^k$, cf. C. A. Micchelli and A. Pinkus, cited above. From this formula we see that the sequence $\max\{|a_i^r| : i \in Z_{n+r}^k\}$ is nonincreasing as stated above as $r \to \infty$ converges to $\|M_A\|_\infty$ from above while the Baum Welch algorithm generates a nondecreasing sequence which converges to $\|M_A\|_{28}$ from below.

We remark in passing that the sequence $\{a_i : i \in Z_n^k\}$ can also be expressed in terms of the permanent of certain matrices formed from A by repeating its rows and columns, cf. I. P. Goulden and D. M. Jackson, Combinatorial Enumeration, John Wiley, New York, 1983; C. A. Micchelli, cited above.

Density Estimation with Baum Welch, Degree Raising, and Diagonal Scaling—A Numerical Comparison We begin with the kernel $$k(x, y) = \frac{1}{(1 + \|x - y\|^2)^2}, x, y \in R^d \tag{43}$$

which is positive definite for all d. We restrict ourselves to $R^2$ and choose data arranged equally spaced on the unit circle $x^k = (\cos 2\pi k/n, \sin 2\pi k/n)^T, k \in Z_n$. Note that the row sums of the matrix $$K = \begin{pmatrix} k(x^1, x^1) & \cdots & k(x^1, x^n) \\ \vdots & \ddots & \vdots \\ k(x^n, x^1) & \cdots & k(x^n, x^n) \end{pmatrix}$$

are all the same. In our computation, we use the matrix $A = cK$ where c is chosen so that $Ae = e$. Therefore, by Theorem 11 the Baum Welch algorithm given by the iteration $$c^{(k+1)} = \frac{c^{(k)}}{n} A\left((Ac^k)^{-1}\right), k \in N \tag{44}$$

converges to $\hat{c} = e/n$. Similarly, the penalized likelihood iteration $$c^{(k+1)} = \sqrt{\frac{c^k}{Ac^k}}, k \in N \qquad (45)$$

will converge to ĉ.

Our numerical experience indicates that the performance of these iterations for moderate values of n up to about 100 is insensitive to the initial starting vector. Therefore, as a means of illustration we chose n=4 and randomly pick as our starting vector $c^1=(0.3353, 0.1146, 0.2014, 0.3478)^T$. We plot in FIG. 1 for both iterations above the error $\epsilon^k=\|c^k-e/n\|_2$ on a log scale. One can see that the convergence is exponential as the curves plotted are straight lines.

In our next example, we compute the maximum of the homogenous polynomial $M_A$ on $S^3$ where A is an n×3 matrix. Such a problem arises in language modeling where n typically falls in the range from one million to eight hundred million, see L. R. Bahl, P. F. Brown, P. V. de Souza, R. L. Mercer and D. Nahamoo, cited above. In our numerical example we restrict ourselves to n=20, and consider the multiquadric matrix $$A=\{(1+|i-j|^2)^{1/2}\}_{i\in Z_n, j\in Z_3}$$

and the cosine matrix $$A = \left\{\cos^2\left(\frac{2\pi(i+j)}{n}\right)\right\}_{i\in Z_n, j\in Z_3}.$$

Figures 2A, 2B:
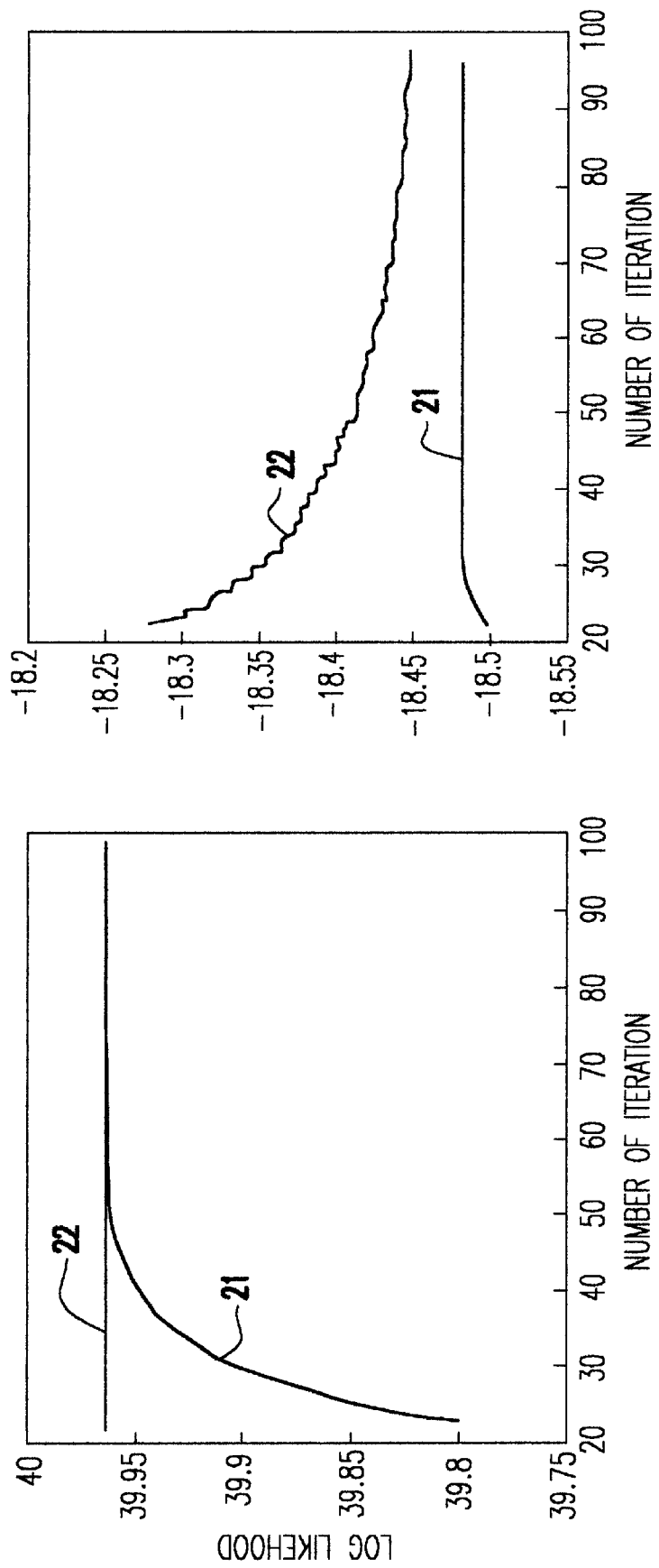
FIG. 2A is a plot of the Baum Welch estimator for the multiquadric and the cosine matrix.
FIG. 2B is a plot of the degree raising estimator for the multiquadric and the cosine matrix.

In each case, we plot in FIGS. 2A and 2B $\log|M_A(c^k)|, k\in N$ for $c^k$ generated by the Baum Welch algorithm and also degree raising. Note the monotone behavior of the computed values. In the Baum-Welch case 21 we choose c=e/3 as our initial vector. The degree raising iteration 22 does not require an initial vector. Note that in the first graph in FIG. 2A degree raising converges in one step, while in the second case shown in FIG. 2B Baum Welch does much better than degree raising.

We now turn our attention to univariate density estimation. We compare the Parzen estimator to those generated by the Baum Welch algorithm applied to maximizing $M_K$ on $S^n$ and the PML estimator obtained by maximizing $P_M$ on $R_+^n$, rescaled to $S^n$. Although we have examined several typical density functions including the chi-squared, uniform and logarithmic densities, we restrict our discussion to two bimodal densities generated from a mixture of two gaussians.

Recall that the Parzen estimator is given by $$\frac{1}{nh}\sum_{i=1}^{n} hk\left(\frac{x-x^i}{h}\right), x \in R.$$

Figure 3:
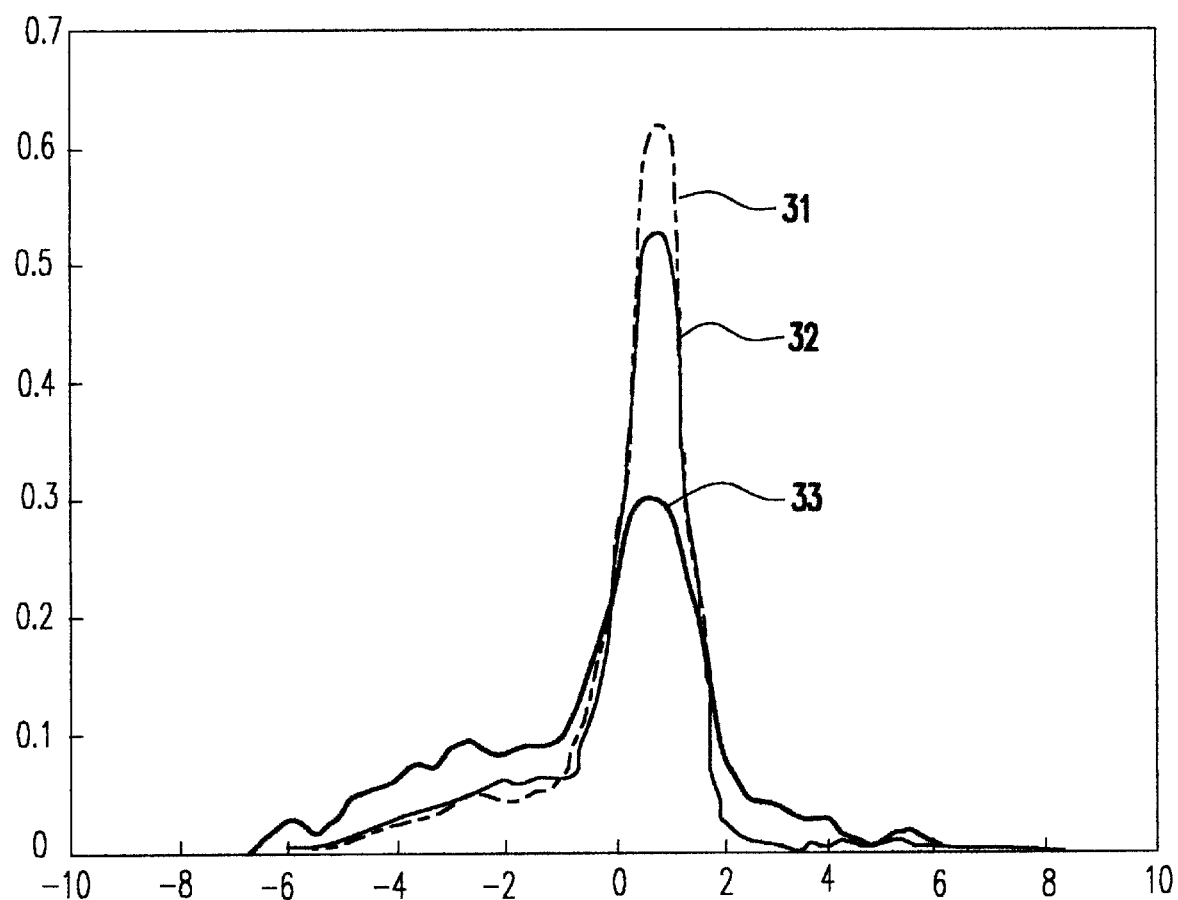
FIG. 3 is a plot of the PMLE, the Parzen estimator and the actual probability density for n=500, h=0.3 and the gaussian kernel.

In our numerical examples we choose n=500, h=0.3, and $k(x)=1/\sqrt{2\pi}e^{-x^2/2}, x\in R$. In FIG. 3 the actual bimodal density is denoted by reference numeral 31 while the Parzen estimator is denoted by reference numeral 32 and the PMLE estimator is denoted by reference numeral 33.

Figure 4:
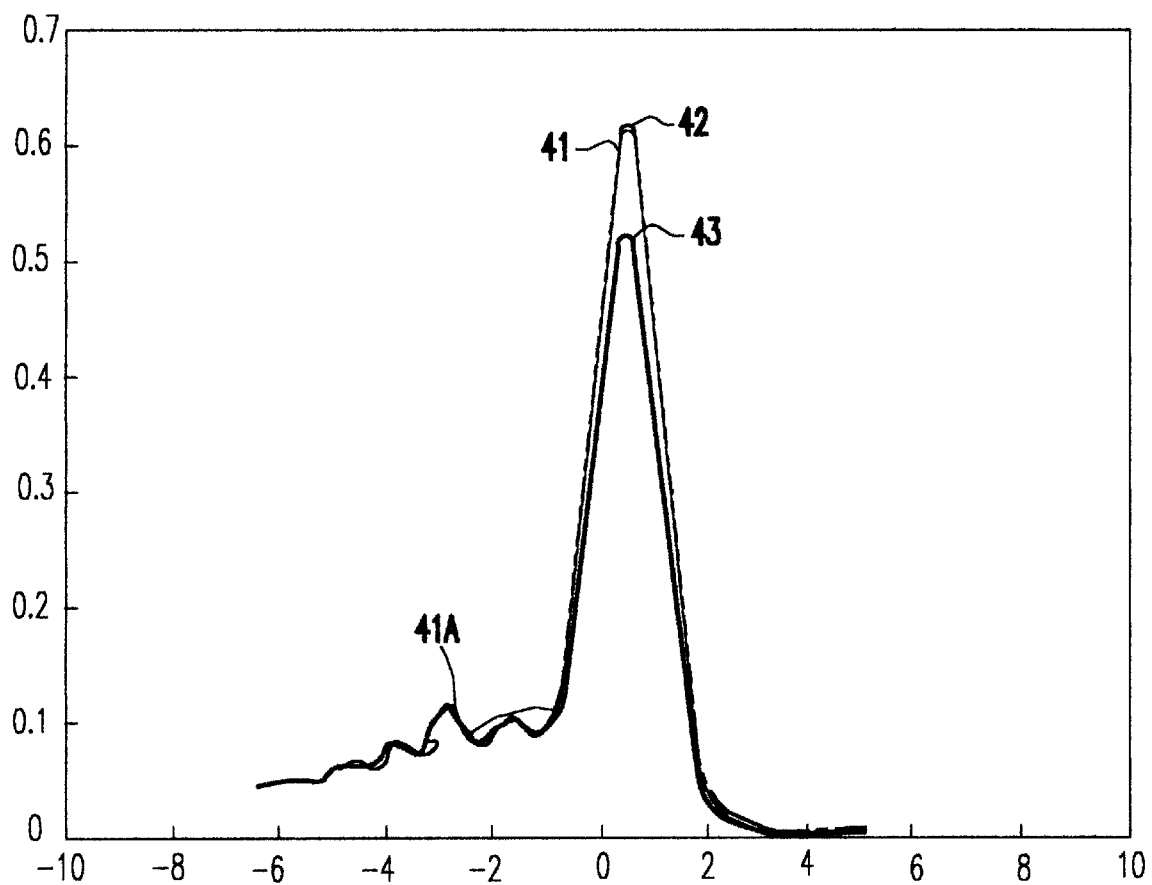
FIG. 4 is a plot of the Baum Welch density estimator, the Parzen estimator and the actual probability density for n=500, h=0.3 and the gaussian kernel.

In FIG. 4, we display the Baum Welch estimator. It is interesting to note that the Baum Welch estimator, denoted by reference numeral 41, fits the peak of the true density, denoted by reference numeral 42, much better than the Parzen estimator, denoted by reference numeral 43, but it also displays more of an oscillatory behavior at 41a.

Figure 5B:
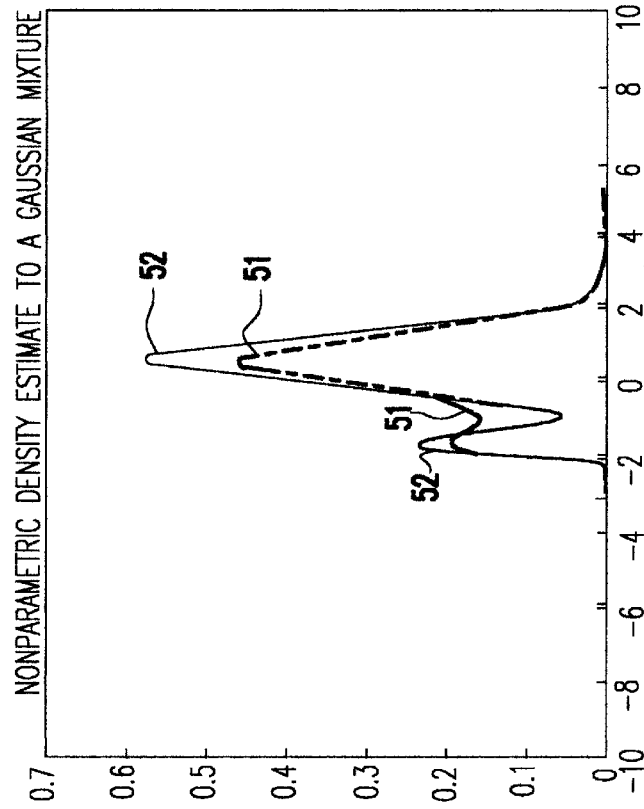
FIG. 5B is a plot of the Parzen estimator for n=500, h=0.3 and the gaussian kernel.
Figure 5A:
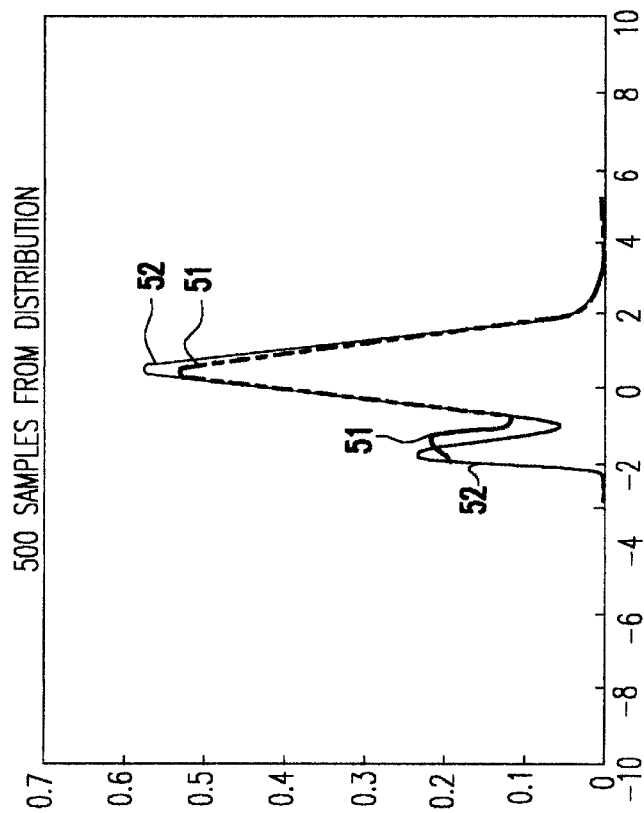
FIG. 5A is a plot of the Baum Welch estimator for n=500, h=0.3 and the gaussian kernel.
Figure 8A:
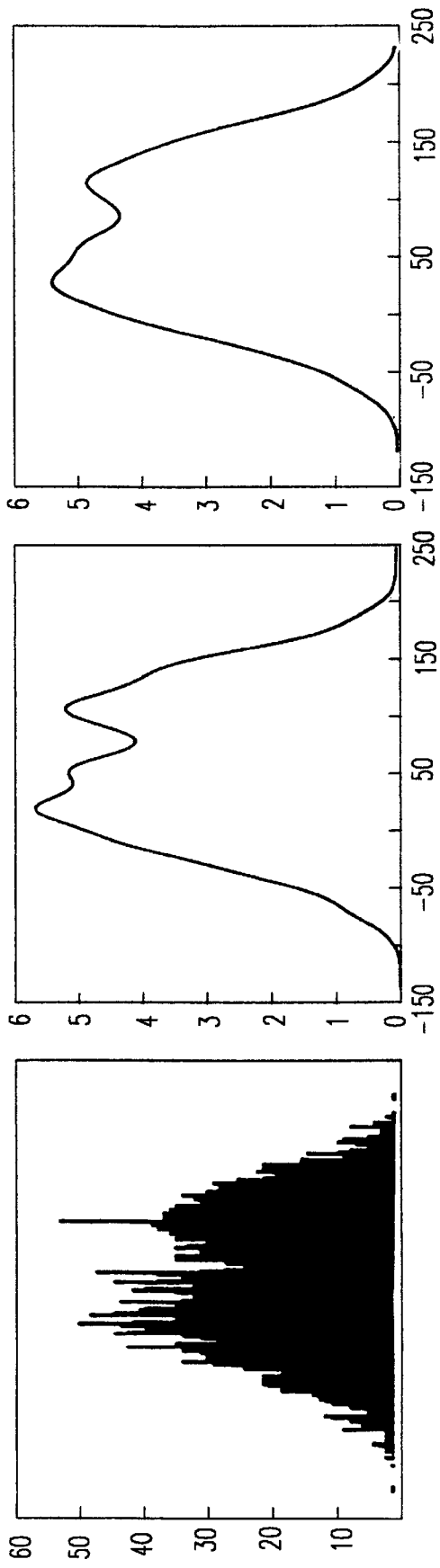
FIG. 8A are plots of the histogram, the Baum Welch estimator and the Parzen estimator for leaf 1 of ARC AA_1, dimension 0.
Figure 8B:
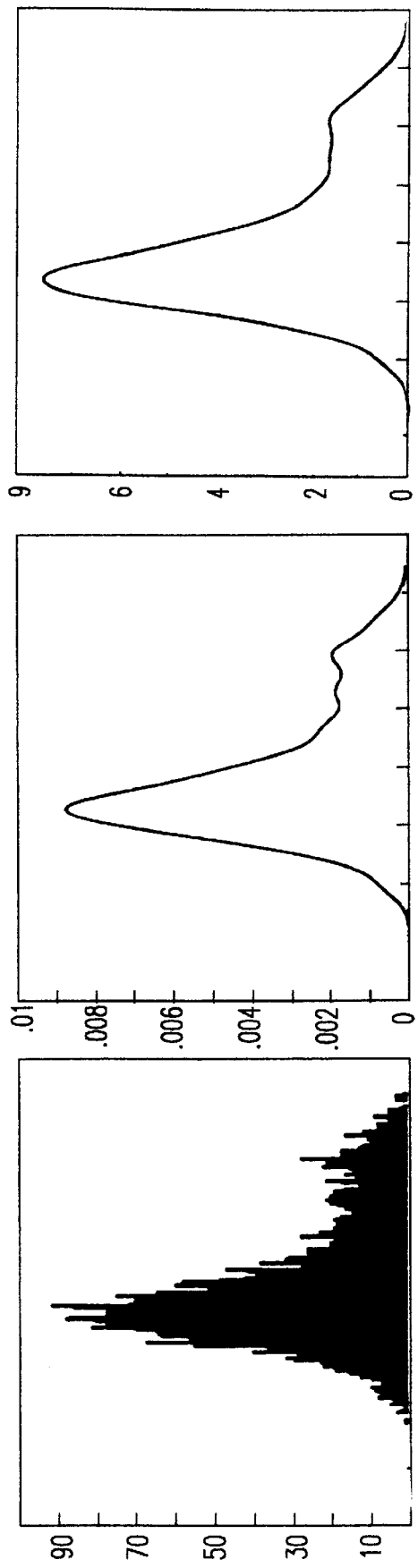
FIG. 8B are plots of the histogram, the Baum Welch estimator and the Parzen estimator for leaf 2 of ARC AA_1, dimension 0.
Figure 8C:
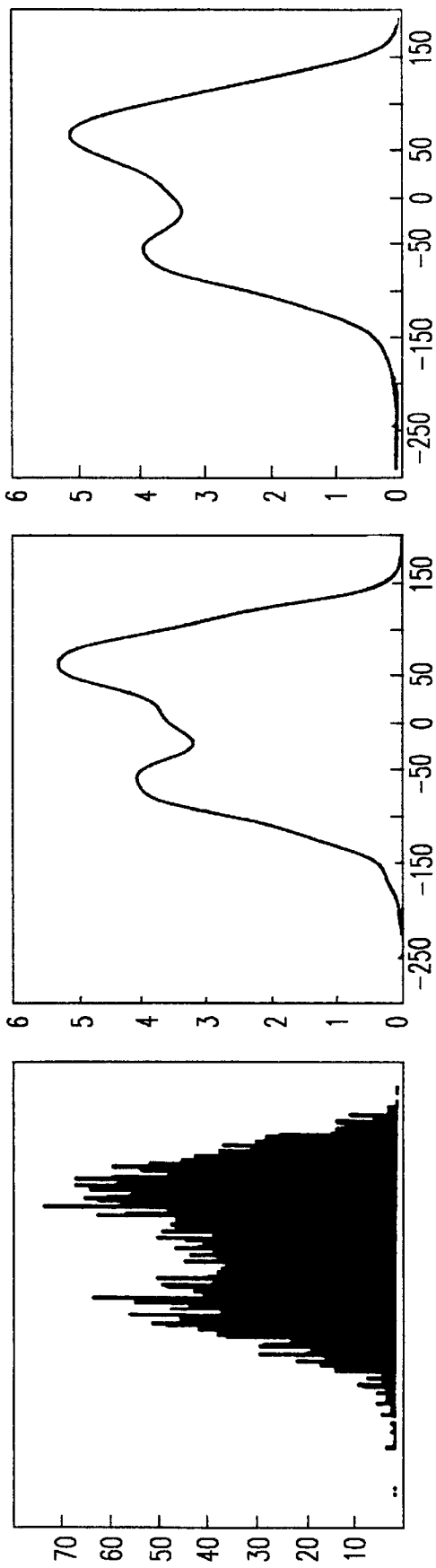
FIG. 8C are plots of the histogram, the Baum Welch estimator and the Parzen estimator for leaf 7 of ARC AA_1, dimension 0.
Figure 8D:
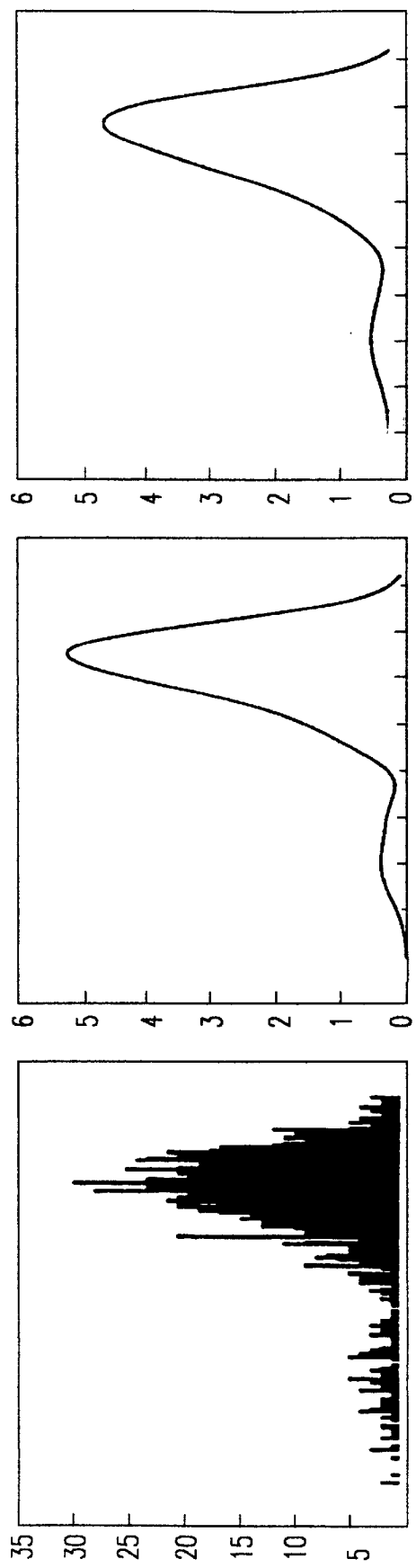
FIG. 8D are plots of the histogram, the Baum Welch estimator and the Parzen estimator for leaf 11 of ARC AA_1, dimension 0.
Figure 8E:
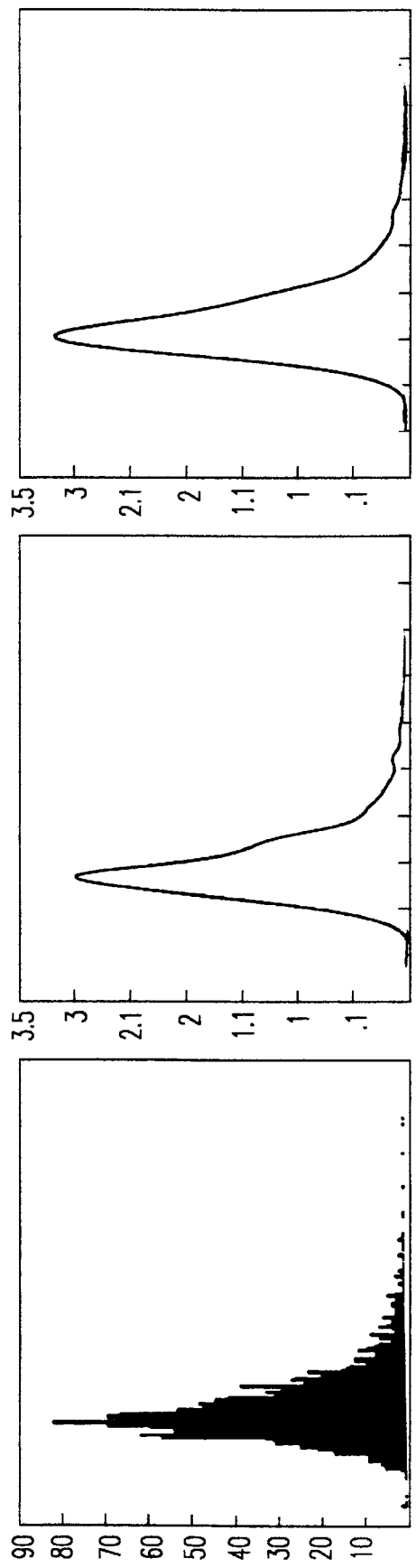
FIG. 8E are plots of the histogram, the Baum Welch estimator and the Parzen estimator for leaf 5 of ARC AA_1, dimension 25; and, FIG. 8F are plots of the histogram, the Baum Welch estimator and the Parzen estimator for leaf 2 of ARC AA_1, dimension 25.
Figure 8F:
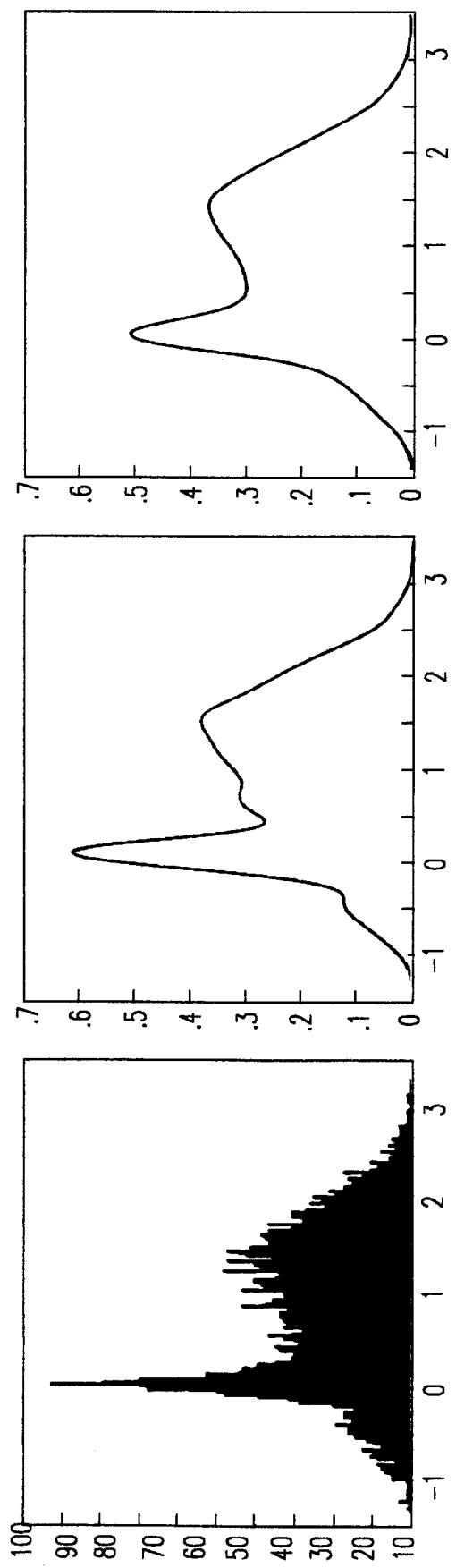

In FIGS. 5A and 5B, we choose a bimodal density with more discernible humps and compare graphically the behavior of the Baum Welch estimates, denoted by reference numeral 51, to the Parzen estimator, denoted by the reference numeral 52.

All the methods above are sensitive to the kernel k, the bin size h and the sample size n. For example, choosing h to be 0.6, but keeping the same value n=500 and a gaussian kernel the new Baum Welch estimator, denoted by reference numeral 61, with the actual probability density, denoted by the reference numeral 62, appears in FIGS. 6A and 6B.

Increasing the sample size to n=2000 while maintaining the value h=0.3 and a gaussian kernel the Baum Welch estimator takes the form in FIGS. 6A and 6B.

Changing the kernel k produces more dramatic alterations in the density estimator. For example we consider two spline kernels $k_i(x,y)=f_i(x-y/h), x, y\in R$ where $$f_i(x) = \begin{cases} b(a^2-x^2)^i, & \text{for } |x|<a \\ 0, & \text{otherwise} \end{cases}$$

for i=1,2, where the constants a and b are chosen so that $$\int_{-\infty}^{\infty} f_i(x)dx = \int_{-\infty}^{\infty} f_i(x)dx = 1.$$

The corresponding Baum Welch estimators, denoted by reference numeral 71, for h=0.3 and n=500 are displayed in FIGS. 7A and 7B. These graphs seem to indicate that the gaussian kernel works best.

We now apply the Baum Welch and the Parzen estimator to speech data and graphically compare their performance. The speech data is taken from the Wall Street Journal database for the sound AA (as in the word absolve—pronounced AE B Z AA L V). To explain what we have in mind we recall how such data is generated.

Digitized speech sampled at a rate of 16 KHz is considered. A frame consists of a segment of speech of duration 25 msec, and produces a 39 dimensional acoustic cepstral vector via the following process, which is standard in speech recognition literature. Frames are advanced every 10 msec to obtain succeeding acoustic vectors.

First, magnitudes of discrete Fourier transform of samples of speech data in a frame are considered in a logarithmically warped frequency scale. Next, these amplitude values themselves are transformed to a logarithmic scale, and subsequently, a rotation in the form of discrete cosine transform is applied. The first 13 components of the resulting vector are retained. First and the second order differences of the sequence of vectors so obtained are then appended to the original vector to obtain the 39 dimensional cepstral acoustic vector.

As in supervised learning tasks, we assume that these vectors are labeled according to their corresponding basic sounds. In fact, the set of 46 phonemes are subdivided into a set of 126 different variants each corresponding to a "state" in the hidden Markov model used for recognition purposes. They are further subdivided into more elemental sounds called allophones or leaves by using the method of decision trees depending on the context in which they occur, see, e.g., F. Jelinek, cited above; L. R. Bahl, P. V. Desouza, P. S. Gopalkrishnan and M. A. Picheny, "Context dependent vector quantization for continuous speech recognition," *Proceedings of IEEE Int. Conf. on Acoustics Speech and Signal Processing*, pp. 632–35, 1993; Leo Breiman, Classification and Regression Trees, Wadsworth International, Belmont, Calif., 1983, for more details.

Among these most elemental of sounds known as leaves or allophones we picked five distinct leaves and two distinct dimensions all chosen from the vowel sound AA's first hidden Markov models state AA_1. The result of generating a histogram with 200 bins, the Baum Welch estimator and the Parzen estimator for six distinct choices of leaf, dimension pairs are displayed in FIGS. 8A to 8F. The Parzen estimator and the Baum Welch estimator both used the choice $h=2.5n^{-1/5}$ and a gaussian kernel. The values of n was prescribed by the individual data sets and the values were 3,957, 4,526, 2,151, 4,898 and 1,183 for respectively leaves 1, 2, 5, 7 and 11. The columns in FIG. 8 are respectively the density estimators for the histogram, the Baum Welch and the Parzen estimator. It can be seen from these examples that the Baum Welch estimator capture finer details of the data than does the Parzen estimator for the same value of h.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method for machine recognition of speech, comprising the steps of:

inputting acoustic data;

forming a nonparametric density estimator $$f_n(x) = \sum_{i \in Z_n} c_i k(x, x^i), x \in R^d, \text{ where } Z_n = \{1, 2, \ldots, n\}, k(x, y)$$

is some specified positive kernel function, $$c_i \geq 0, i \in Z_n, \sum_{i=1}^{n} c_i = 1$$

are parameters to be chosen, and $\{x^i\}_{i \in Z_n}$ is a given set of training data;

setting a kernel for the estimator;

selecting a statistical criterion to be optimized to find values for parameters defining the nonparametric density estimator; and iteratively computing the density estimator for finding a maximum likelihood estimation of acoustic data.

2. The computer implemented method for machine recognition of speech as recited in claim 1, wherein the statistical criterion to be optimized is selected from a penalized maximum likelihood criteria or a maximum likelihood criteria.

3. The computer implemented method for machine recognition of speech as recited in claim 2, wherein the maximum likelihood criteria is selected.

4. The computer implemented method for machine recognition of speech as recited in claim 3, wherein a process of degree raising of polynomials is used for global maximization.

5. The computer implemented method for machine recognition of speech as recited in claim 3, wherein the step of iteratively computing employs a process of diagonal balancing of matrices to maximize the likelihood.

6. The computer implemented method for machine recognition of speech as recited in claim 5, wherein a form of the iteratively computing is $\hat{c}=c/nA^T((Ac)^{-1})$, where $c=(c_1, c_2, \ldots, c_n)$, $c_i \geq 0$, $$\sum_{i=1}^{n} c_i = 1$$

is an initial choice for the parameters, $\hat{c}$ is the updated parameter choice, and $K=\{k(x^i,x^j)\}_{i,j \in Z_n}$, $A=cK$, where c is chosen such that $Ae=e$ for $e=(1, 1, \ldots, 1)$.

7. The computer implemented method for machine recognition of speech as recited in claim 2, wherein the penalized maximum likelihood criteria is selected.

8. The computer implemented method for machine recognition of speech as recited in claim 7, wherein the step of iteratively computing employs a process of diagonal balancing of matrices to maximize the penalized likelihood.

9. The computer implemented method for machine recognition of speech as recited in claim 8, wherein the step of iteratively computing the density estimator uses an update of parameters given as a unique vector $v \in \text{int} S^n(b)$ satisfying $v \cdot Kv = K((Kc)^{-1}) \cdot c - \gamma v \cdot b$, where $b_i = \int_{R^d} k(x,x^i) dx$, $b=(b_1, b_2, \ldots, b_n)$, $S^n(b) = \{c : c \in R^d, b^T c = 1\}$ and $\gamma = n - v^T Kv$.

10. The computer implemented method for machine recognition of speech as recited in claim 9, wherein the update parameter is given as $$v = \frac{c \cdot K((Kc)^{-1} - \sigma e)}{n - \sigma c^T Kc},$$

where $\sigma > 0$ is a parameter chosen to yield a best possible performance.

11. The computer implemented method for machine recognition of speech as recited in claim 1, wherein the kernel is a Gaussian kernel.

12. The computer implemented method for machine recognition of speech as recited in claim 1, wherein the kernel is given by the formula $$k(x, y) = \frac{1}{(1 + \|x - y\|^2)^2},$$

$x, y \in R^d$, where $k(x,y)$, $x,y \in R^d$ is a reproducing kernel for a Hilbert space of functions on $R^d$.

13. The computer implemented method for machine recognition of speech as recited in claim 1, wherein $$c = \frac{e}{n} \text{ and } k(x, y) = \frac{1}{h} k\left(\frac{x-y}{h}\right).$$

14. The computer implemented method for machine recognition of speech as recited in claim 1, further comprising the step of assigning the maximum likelihood estimation to a phoneme label.

15. The computer implemented method for machine recognition of speech as recited in claim 1, wherein the non-parametric density estimator has the form $$f_n(x) = \frac{1}{nh^d} \sum_{i \in Z_n} k\left(\frac{x - x^i}{h}\right),$$

$x \in R^d$, where $Z_n = \{1, \ldots, n\}$, k is some specified function, and $\{x^i : i \in Z_n\}$ is a set of observations in $R^d$ of some unknown random variable.

* * * * *